United States Patent
Balasubramanian et al.

(10) Patent No.: US 11,729,771 B2
(45) Date of Patent: Aug. 15, 2023

(54) ZONE BASED OPERATING MODE CONFIGURATION

(71) Applicant: QUALCOMM Incorporated, San Diego, CA (US)

(72) Inventors: Anantharaman Balasubramanian, San Diego, CA (US); Navid Abedini, Basking Ridge, NJ (US); Wanshi Chen, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/127,132

(22) Filed: Dec. 18, 2020

(65) Prior Publication Data

US 2022/0201668 A1 Jun. 23, 2022

(51) Int. Cl.
*H04W 72/20* (2023.01)
*H04L 5/00* (2006.01)
*H04L 5/14* (2006.01)
*H04W 24/08* (2009.01)

(52) U.S. Cl.
CPC .......... *H04W 72/20* (2023.01); *H04L 5/0048* (2013.01); *H04L 5/14* (2013.01); *H04W 24/08* (2013.01)

(58) Field of Classification Search
CPC ............................................. H04W 72/0406
See application file for complete search history.

(56) References Cited

U.S. PATENT DOCUMENTS

| | | | |
|---|---|---|---|
| 7,636,327 B1 * | 12/2009 | Doran ...................... | H04L 5/14 370/278 |
| 10,104,563 B2 * | 10/2018 | Fang ..................... | H04W 24/02 |
| 2013/0188530 A1 * | 7/2013 | Pirskanen ......... | H04W 72/0453 370/280 |
| 2019/0140812 A1 * | 5/2019 | Abedini ............. | H04W 52/343 |
| 2021/0250872 A1 * | 8/2021 | Takeda ............... | H04W 52/245 |
| 2021/0392650 A1 * | 12/2021 | Abedini ................... | H04L 5/16 |
| 2022/0200777 A1 * | 6/2022 | Lee .................. | H04W 72/0453 |

FOREIGN PATENT DOCUMENTS

WO WO-2017111905 A1 * 6/2017
WO WO-2021237385 A1 * 12/2021

* cited by examiner

*Primary Examiner* — Abdeltif Ajid
(74) *Attorney, Agent, or Firm* — Holland & Hart LLP

(57) ABSTRACT

Methods, systems, and devices for wireless communications are described. A base station may determine a default operating mode based on the geographic location (e.g., zone) of the base station, for user equipment (UEs) operating in that zone to use. The operating mode may be a full duplex (FD) operating mode or a half duplex (HD) operating mode. A UE operating in the zone may receive, from the base station, an indication of the default operating mode corresponding to the zone, and may select an operating mode based on the indication. The mode selected by the UE may be the same as or different than the indicated default operating mode. For example, the UE may determine to use either FD mode or HD mode based on operation parameters, interference measurements, signaling from a base station or other UEs, one or more measurement thresholds, or some combination thereof.

16 Claims, 19 Drawing Sheets

ZONE BASED OPERATING MODE CONFIGURATION

FIELD OF TECHNOLOGY

The following relates to wireless communications, including zone based operating mode configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless communications system may support the use of full duplex (FD) communications. A UE operating in an FD operating mode may transmit and receive data packets in a same time period. FD communications may increase spectral efficiency due to the concurrent transmission and reception of information. However, enabling FD communication in an environment with numerous blockages and interference may hamper data transfer.

SUMMARY

The described techniques relate to improved methods, systems, devices, and apparatuses that support zone based operating mode configuration. Generally, the described techniques provide for a user equipment (UE) to select between a full duplex (FD) operating mode and a half duplex (HD) operating mode based on a geographic location, measurements, or other factors, and to communicate with a base station according to the operating mode. A base station may determine a default operating mode (e.g., FD or HD), based on the geographic location (e.g., zone) of the base station, for UEs operating in that zone to use. A UE operating in the zone may receive, from the base station, an indication of the default operating mode corresponding to the zone, and may choose to operate in either the FD mode or the HD mode. The mode selected by the UE may be the same as or different than the indicated default operating mode. For example, the UE may determine to use either FD mode or HD mode based on operation parameters, interference measurements, signaling from a network entity (e.g., a gNB or roadside unit (RSU)), or other UEs, reference signal received power (RSRP) thresholds, quality of service (QoS) thresholds, relative velocity thresholds, or some combination of these factors. The UE may communicate with the base station based on the determined operating mode.

In some cases, a UE may determine an operating mode based on UE location (e.g., a crossroads, a cell edge, etc.) and operation information (e.g., corresponding to the UE location). Operation information may include operation communication parameters and interference measurements. In some examples, the UE may transmit operation information to other UEs, a base station, or the like. A receiving UE may receive operation information and may independently determine an operating mode. Additionally, or alternatively, a UE may determine an operating mode based on satisfying a measurement threshold. If the UE determines that the measurement threshold is satisfied, the UE may enable FD communications. Otherwise, the UE may revert to HD communications.

A method for wireless communication at a user equipment (UE) is described. The method may include receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period, selecting between the full duplex mode and the half duplex mode as an operating mode for the UE in the zone based on the default operating mode for the zone, and communicating with a base station according to the selected operating mode.

An apparatus for wireless communication at a UE is described. The apparatus may include a processor, memory in electronic communication with the processor, and instructions stored in the memory. The instructions may be executable by the processor to cause the apparatus to receive control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period, select between the full duplex mode and the half duplex mode as an operating mode for the UE in the zone based on the default operating mode for the zone, and communicate with a base station according to the selected operating mode.

Another apparatus for wireless communication at a UE is described. The apparatus may include means for receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period, means for selecting between the full duplex mode and the half duplex mode as an operating mode for the UE in the zone based on the default operating mode for the zone, and means for communicating with a base station according to the selected operating mode.

A non-transitory computer-readable medium storing code for wireless communication at a UE is described. The code may include instructions executable by a processor to receive control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period, select between the full duplex mode and the half duplex mode as an operating mode for the UE in the zone based on the default operating mode for the zone, and communicate with a base station according to the selected operating mode.

In some examples of the method, apparatuses, and non-transitory computer-readable medium described herein, the control information may be received via a system information block (SIB).

Some examples of the method, apparatuses, and non-transitory computer-readable medium described herein may further include operations, features, means, or instructions for determining one or more communication parameters associated with the operating mode. In some examples of the method, apparatuses, and non-transitory computer-readable medium described herein, determining the one or more communication parameters may include operations, features, means, or instructions for receiving control information indicating the one or more communication parameters associated with the operating mode. In some examples of the method, apparatuses, and non-transitory computer-readable medium described herein, the one or more communication parameters include a beam, a beam direction, a modulation and coding scheme, a number of layers, a power configuration, a timing configuration, or a combination thereof.

In some examples of the method, apparatuses, and non-transitory computer-readable medium described herein, selecting between the full duplex mode and the half duplex mode may include operations, features, means, or instructions for receiving control information indicating the operating mode.

In some examples of the method, apparatuses, and non-transitory computer-readable medium described herein, selecting between the full duplex mode and the half duplex mode may include operations, features, means, or instructions for performing measurements to determine an amount of interference in the zone, selecting the operating mode based on the performing the measurements, and transmitting a measurement indication including an indication of the amount of interference in the zone. In some examples of the method, apparatuses, and non-transitory computer-readable medium described herein, the measurements include a clutter measurement, an interference measurement, or some combination thereof.

In some examples of the method, apparatuses, and non-transitory computer-readable medium described herein, the operating mode may be different than the default operating mode.

Some examples of the method, apparatuses, and non-transitory computer-readable medium described herein may further include operations, features, means, or instructions for receiving a measurement indication including an indication of an amount of interference in the zone, where the operating mode may be selected based on receiving the measurement indication.

Some examples of the method, apparatuses, and non-transitory computer-readable medium described herein may further include operations, features, means, or instructions for transmitting, to one or more other UEs in the zone, an indication of the operating mode and an indication of the zone.

In some examples of the method, apparatuses, and non-transitory computer-readable medium described herein, selecting between the full duplex mode and the half duplex mode may include operations, features, means, or instructions for receiving one or more indications from one or more other UEs indicating the operating modes and zones of the one or more other UEs, determining, based on the one or more received indications, a number of other UEs in the zone that may be operating in the full duplex mode, and determining whether the number of other UEs in the zone that may be operating in the full duplex mode satisfies a threshold.

Some examples of the method, apparatuses, and non-transitory computer-readable medium described herein may further include operations, features, means, or instructions for selecting between the full duplex mode and the half duplex mode based on a relative velocity between the UE and a second UE and a quality of service requirement.

Some examples of the method, apparatuses, and non-transitory computer-readable medium described herein may further include operations, features, means, or instructions for selecting between the full duplex mode and the half duplex mode based on a reference signal received power (RSRP) measurement.

A method for wireless communication at a base station is described. The method may include determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period, transmitting control information indicating the default operating mode to one or more UEs in the zone, and communicating with the one or more UEs in the zone based on the indication of the default operating mode.

An apparatus for wireless communication at a base station is described. The apparatus may include a processor, memory in electronic communication with the processor, and instructions stored in the memory. The instructions may be executable by the processor to cause the apparatus to determine a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period, transmit control information indicating the default operating mode to one or more UEs in the zone, and communicate with the one or more UEs in the zone based on the indication of the default operating mode.

Another apparatus for wireless communication at a base station is described. The apparatus may include means for determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period, means for transmitting control information indicating the default operating mode to one or more UEs in the zone, and means for communicating with the one or more UEs in the zone based on the indication of the default operating mode.

A non-transitory computer-readable medium storing code for wireless communication at a base station is described. The code may include instructions executable by a processor to determine a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period, transmit control information indicating the default operating mode to one or more UEs in the zone, and communicate with the one or more UEs in the zone based on the indication of the default operating mode.

In some examples of the method, apparatuses, and non-transitory computer-readable medium described herein, the control information may be transmitted via an SIB.

Some examples of the method, apparatuses, and non-transitory computer-readable medium described herein may further include operations, features, means, or instructions for determining one or more communication parameters associated with the default operating mode and transmitting control information indicating the one or more communication parameters associated with the default operating mode. In some examples of the method, apparatuses, and non-transitory computer-readable medium described herein, the one or more communications parameters include a beam, a beam direction, a modulation and coding scheme, a number of layers, a power configuration, a timing configuration, or a combination thereof.

Some examples of the method, apparatuses, and non-transitory computer-readable medium described herein may further include operations, features, means, or instructions for determining, for a UE in the zone, an operating mode for the UE to use based on determining a number of UEs in the zone, an amount of interference in the zone, a signal density in the zone, or some combination thereof and transmitting, to the UE, an indication of the determined operating mode.

In some examples of the method, apparatuses, and non-transitory computer-readable medium described herein, the determined operating mode may be different from the default operating mode.

In some examples of the method, apparatuses, and non-transitory computer-readable medium described herein, the operating mode may be determined based on a subscription level of the UE.

Some examples of the method, apparatuses, and non-transitory computer-readable medium described herein may further include operations, features, means, or instructions for identifying one or more thresholds to be used in determining the default operating mode and transmitting, to the UE, an indication including the one or more thresholds.

Some examples of the method, apparatuses, and non-transitory computer-readable medium described herein may further include operations, features, means, or instructions for receiving, from a UE in the zone, a measurement indication including an indication of an amount of interference in the zone, determining, based on the measurement indication, an operating mode for the UE to use that may be different than the default operating mode, and transmitting, to the UE, an indication of the determined operating mode.

DETAILED DESCRIPTION

Figure 1:
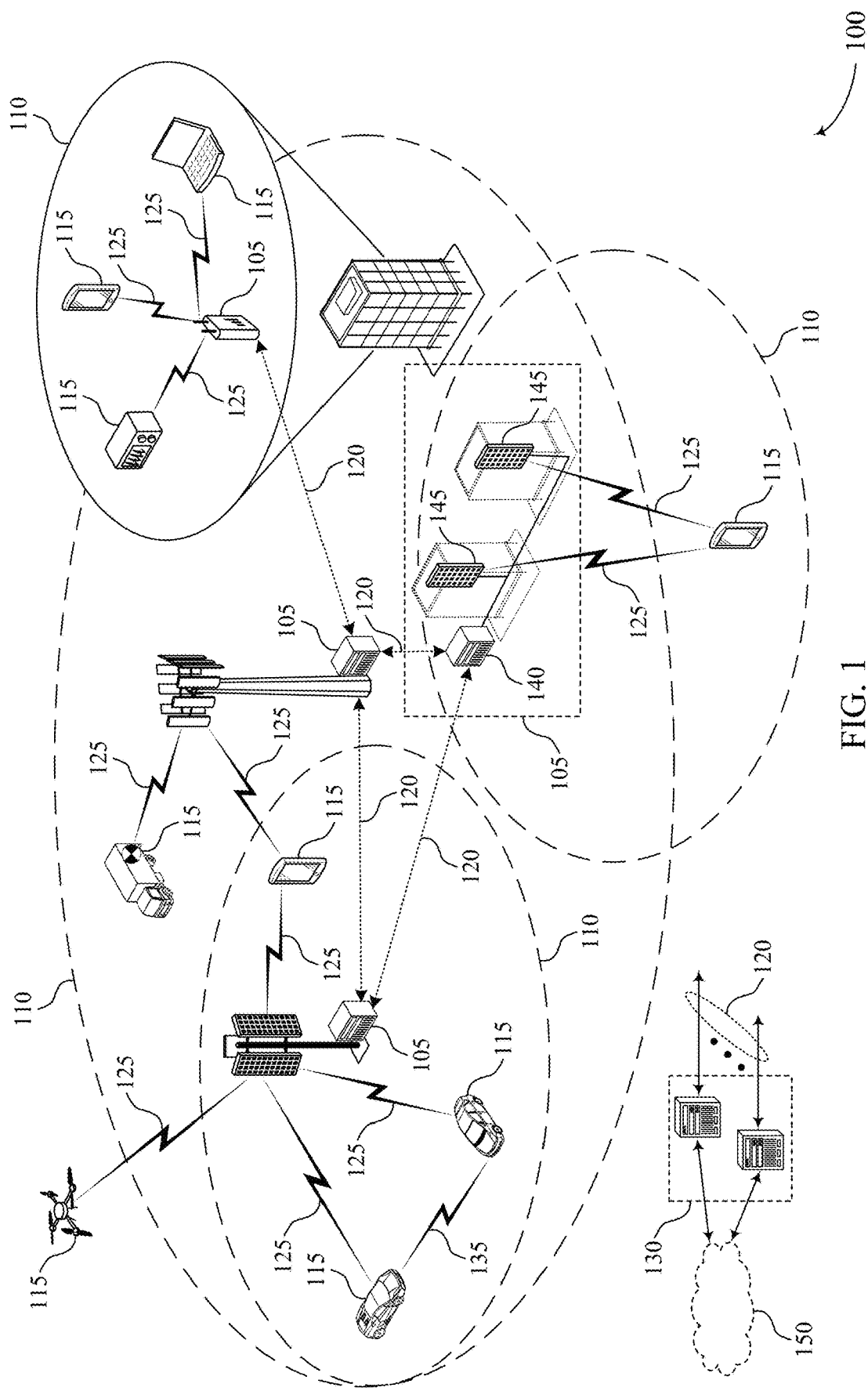
FIGS. 1 through 5 illustrate examples of wireless communications systems that support zone based operating mode configuration in accordance with aspects of the present disclosure.

Some wireless communications systems may support the use of a full duplex (FD) operating mode. Communications in FD mode allow a user equipment (UE) to transmit and receive data packets in a same time period (e.g., in a same symbol, in a same slot, etc.). FD communications may increase spectral efficiency due to the concurrent transmission and reception of information. In some cases, however, FD communication may not be practical. For example, communicating with FD techniques may introduce self-interference (e.g., array leakage), rendering FD communication unfeasible. Further, enabling FD communication in certain environments may hamper data transfer. For example, a UE which supports FD communication may be located in an area with numerous physical blockages. If the UE enables FD communication and transmits a signal, the signal may reflect off a blockage, return to the UE, and cause interference at the receiver of the UE. In such a case, the UE may change an operating mode, for example, from FD mode to half duplex (HD) mode. In HD communications, a UE may transmit and receive data packets separately, e.g., in different time periods. HD communications may provide increased reliability in some environments. In other environments, a UE may benefit from the spectral efficiency of FD communications. Improved signaling methods and procedures to support selecting between FD and HD operations may enhance system efficiency.

A base station may determine a default operating mode (e.g., an FD mode or an HD mode) for UEs to use that corresponds to a zone (e.g., a geographic location, a coverage area, a cell, etc.) of the base station. The base station may indicate (e.g., via control signaling), to UEs operating in the zone, the default operating mode. The base station may also determine and indicate one or more communication parameters (e.g., a beam, a beam direction, a modulation and coding scheme (MCS), among other examples) for the default operating mode. In some aspects, the base station may determine and indicate an operating mode for UEs to use that is different from the default operating mode. For example, the base station may determine one or more characteristics of the zone, such as an amount of interference, a signal density, a number of UEs operating in the zone, or some combination thereof. Additionally, or alternatively, the base station may determine an operating mode on a UE-specific basis, and may indicate the operating mode to each UE separately.

A UE operating in the zone may select between FD and HD modes based on the default operating mode indication and may communicate with the base station according to the selected operating mode. The mode selected by the UE may be the same as or different than the indicated default operating mode. In some cases, the UE may select an operating mode that is different than the indicated default operating mode. In some other cases, the UE may initially operate according to the default operating mode, but may switch to a different operating mode. The UE may determine an operating mode based on operation information, such as communication parameters (e.g., MCS, rank, precoder, beam direction, power configuration, timing configuration, etc.), interference measurements, reference signal received power (RSRP) thresholds, quality of service (QoS) thresholds, relative velocity thresholds, or any combination thereof. Additionally, or alternatively, the UE may determine the operating mode based on the UE location. For example, in a vehicle-to-everything (V2X) system, a UE at a crossroads may select an HD mode to reduce interference from other UEs in the area. In another example, in a non-V2X system, the operating mode may be determined by the location of the UE in a coverage region. That is, if the UE is operating at a cell edge, an FD mode may result in reduced performance, and the UE may choose to use an HD mode.

The methods described herein may improve communications efficiency and reliability by providing signaling procedures and techniques for selecting between operating modes. Adaptively selecting between FD and HD operating modes may enhance system efficiency, reduce communication latency, and reduce power consumption at the UE.

Aspects of the disclosure are initially described in the context of wireless communications systems. Aspects of the disclosure are then described with reference to a process flow. Aspects of the disclosure are further illustrated by and described with reference to apparatus diagrams, system diagrams, and flowcharts that relate to zone based operating mode configuration.

FIG. 1 illustrates an example of a wireless communications system 100 that supports zone based operating mode configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may determine an operating mode (e.g., an HD mode, an FD mode) based on the location or zone of the base station 105. The base station 105 may determine a default operating mode for UEs 115 operating in the zone, for example, based on measurements received by the base station 105, the location of UEs 115 within coverage areas 110, UE 115 density in a coverage area 110, communication link types, or the like. The base station 105 may indicate the default operating mode to the UEs 115 (e.g., in control signaling such as broadcast, groupcast, or unicast signaling). A UE 115 operating in the zone may use the indicated default operating mode, or may autonomously determine an operating mode (e.g., that is different than the default operating mode). For instance, the UE 115 may select between an HD mode or an FD mode based on the UE 115 location (e.g., a crossroads, a cell edge, etc.), signaling from one or more proximal UEs 115, measurements performed by the UE 115, or the like.

Figure 2:
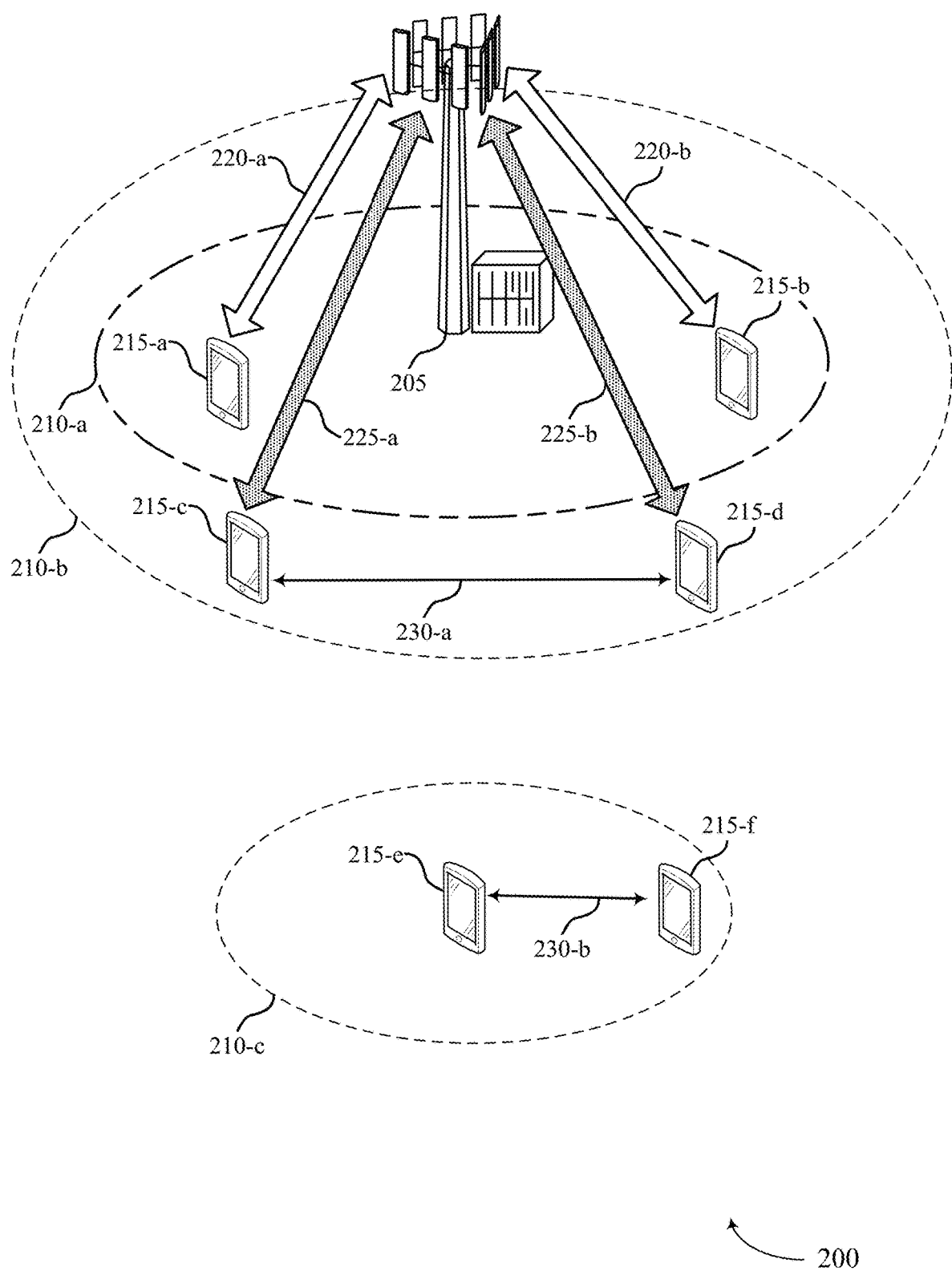

FIG. 2 illustrates an example of a wireless communications system 200 that supports zone based operating mode configuration in accordance with aspects of the present disclosure. In some examples, wireless communications system 200 may implement aspects of wireless communications system 100. The wireless communications system 200 as described herein may be supported in vehicle-to-everything (V2X) deployments, inter access backhaul (IAB) deployments, or the like. The wireless communications system 200 may include a base station 205 and UEs 215, which may be examples of base stations 105 and UEs 115, as described with reference to FIG. 1. Base station 205 may be an example of a gNodeB (gNB), roadside unit (RSU), central unit (CU), distributed unit (DU), or the like. UE 215 may be an example of a vehicle user equipment (vUE), a cell phone, a mobile terminal, or any wireless device supporting UE-like capabilities. Base station 205 may communicate with UEs 215 via a communication link 220, 225. Additionally, or alternatively, UEs 215 may communicate with one another via communication links 230. Communication links 230 may support sidelink communication. Communication links 220, 225, and 230 may be bi-directional communication links.

Devices (e.g., base station 205, UEs 215) in the wireless communications system 200 may operate in an FD operating mode or an HD operating mode. Communications in an FD mode may enable a UE 215 to transmit and receive data packets in a same time period (e.g., in a same slot or symbol) and using the same frequency band. FD communications may be advantageous due to the spectral efficiency of contemporaneous transmission and reception of data. However, enabling FD communications in certain environments may be impractical, or may hamper data transfer. For example, a UE 215 that operates in an FD mode may be located in a geographic area (e.g., a zone 210) with numerous physical blockages. If the UE 215 transmits signaling such as a data packet, the signaling may reflect off a blockage, return to the UE 215, and cause interference at the receiver of the UE 215. Additionally, operating conditions in the zone 210 may change over time, such as increased interference due to increased signal activity in the zone. In such cases, the UE 215 may reduce interference and improve communications by instead operating in an HD mode. In HD communications, a UE 215 may transmit and receive data packets separately, e.g., in different time periods and/or in different frequency bands. HD communications may be more reliable due to dedicated transmit and receive periods. As such, a wireless communications system 200 may support signaling methods and procedures for determining and enabling an optimal operating mode (e.g., FD or HD) for a UE 215 based on a zone 210.

According to the techniques described herein, base station 205 may determine a default operating mode (e.g., HD or FD) based on a zone 210 for one or more UEs 215 operating in the zone 210. For example, the zone 210 may be a zone 210-a or a zone 210-b in which the base station 205 is located that includes one or more UEs 215. Zone 210 may be bounded by a physical environment (e.g., a crossroads, a building, etc.). Additionally, or alternatively, zone 210 may be bounded by a perimeter set by base station 205 (e.g., a coverage area, cell center, cell edge, etc.) or by a UE 215 (e.g., an area around the UE 215 with a predefined radius). The base station 205 may determine the default operating mode for the UEs 215 to use based on characteristics of the zone 210, such as an amount of interference in the zone. For example, if the zone 210 includes a number of static objects and/or physical blockages, or has a high signal density, communicating in an FD operating mode may increase interference. Thus, the base station 205 may determine an HD default operating mode for the zone 210. Alternatively, the zone 210 may lack sources of interference, and the base station 205 may determine an FD default operating mode for the zone 210.

The base station 205 may transmit (e.g., via communication links 220 or 225) control information indicating the default operating mode to the UEs 215 operating in the zone 210. As illustrated, the base station 205 may be located in a zone 210-b and a zone 210-a. The base station 205 may determine a default operating mode for the zone 210-a and may transmit, via communication links 220-a and 220-b, an indication thereof to UEs 215-a and 215-b. Likewise, the base station 205 may determine a default operating mode for zone 210-b and may transmit, via communication links 225-a and 225-b, an indication thereof to UEs 215-c and 215-d.

In some examples, the base station 205 may include, in the control information, communication parameters corresponding to the operating mode. Communication parameters may include selected communication beams, beam directions, a supported data rate (e.g., MCS, rank, precoder, etc.), a number of layers, a power configuration, a timing configuration, or some combination thereof, for the default operating mode. For example, FD communications may correspond to a particular communication operation parameter set. The base station 205 may determine a set of communication parameters (e.g., one or more beam directions, one or more beam indices, and a data rate, among other examples) corresponding to the FD operating mode and may indicate the set as part of the control information.

In some cases, the base station 205 may indicate the default operating mode as part of a system information block (SIB) to the UEs 215. For instance, a base station 205 may be an example of a gNB and may transmit an indication of an operating mode in an SIB message. The SIB message may include an indication of the communication parameters as determined by the base station 205. In other instances, the base station 205 may be an example of a roadside unit (RSU). The RSU may indicate the operating mode in an upper layer (e.g., application layer) or lower layer (e.g., physical layer) message. For example, base station 205 may be an example of an RSU and may transmit, to a UE 215, an indication of an operating mode in an upper layer message. The RSU may include an indication of the communication parameters as determined by the base station 205 within the upper layer message.

In some cases, the base station 205 may determine an operating mode for one or more UEs 215 in the zone 210 that is different from the default operating mode, and may transmit (e.g., via communication links 220 or 225) an indication of the determined operating mode. For instance, the base station 205 may determine that conditions in the zone 210 have changed over time, and a different operating mode may support better communications performance. The base station 205 may determine an operating mode for all or a portion of the UEs 215 in the zone 210 based on the conditions in the zone 210, such as an amount of interference (e.g., indicated by a UE 215 or determined by the base station 205), a signal density, or a number of UEs 215 operating in the zone 210. For example, the number of UEs 215 operating in the zone 210-a may increase over time, and the base station 205 may determine and indicate that UEs 215-a and 215-b should use an HD operating mode.

Additionally or alternatively, the base station 205 may determine an operating mode on a UE-specific basis and may transmit an indication of an operating mode separately to each UE 215. In such examples, the operating mode may be based on a location of the UE 215 within the zone 210. As illustrated, UEs 215-c and 215-d may be located at an edge of the zone 210-b, and may therefore experience increased interference (e.g., from other nearby base stations). The base station 205 may determine that UEs 215-c and 215-d should use an HD operating mode to avoid complications associated with using FD communications in a high-interference area, and may transmit an indication accordingly.

In some aspects, the base station 205 may determine the operating mode on a UE-specific basis based on the connection of the UE 215 to the base station 205. In the example of FIG. 2, UEs 215-a and 215-b may be connected to the base station 205 via a Uu connection 220. In such a case, the base station 205 may indicate that UEs 215-a and 215-b operate in FD mode based on determining that UEs 215-a and 215-b are Uu connected to base station 205. Additionally, the base station 205 may determine the operating mode based on the subscription level (e.g., the service provider, the supported data rate provided by a service provider, etc.) of the UE 215. For example, UE 215-a may have a Uu connection to the base station 205 and may be supported by a first service provider. UE 215-b may have a Uu connection to the base station 205 and may be supported by a second service provider. The base station 205 may determine that UE 215-a corresponding to the first service provider may use an FD operating mode while UE 215-b corresponding to the second service provider may use an HD operating mode. As such, the base station may indicate that UE 215-a may use an FD operating mode. Further, the base station may indicate to the UE 215-b that UE 215-b may enable HD communications.

A UE 215 operating in a zone 210 may receive the indication of the default operating mode and may select an operating mode (e.g., FD or HD) to use in the zone 210. The selected operating mode may be the same as or different from the default operating mode. For instance, the UE 215 may select an operating mode based on an amount of interference in the zone 210, e.g., as measured by the UE 215 or as indicated by one or more other UEs 215. Alternatively, the UE 215 may receive an indication of an operating mode used by each UE 215 and may select an operating mode accordingly. For example, if the UE 215 receives indications that a number of other UEs operating in FD mode satisfies a threshold, the UE may determine to use an HD mode, e.g., if the interference caused by the number of UEs operating in FD mode would result in poor communication performance. In some examples, the UE 215 may select an operating mode based on one or more other thresholds being satisfied, such as a quality of service (QoS) threshold. In some cases, the UE 215 may determine communication parameters associated with the selected operating mode. For example, the UE 215 may receive control information indicating the communication parameters. Alternatively, the UE 215 may independently determine the communication parameters.

In some aspects, a UE 215 may determine an operating mode based on performing one or more measurements. For instance, UEs 215 may perform interference measurements or clutter measurements of a surrounding area. The UEs 215 may perform such measurements independently or as instructed by a base station 205. As an example, UE 215-a may perform interference measurements of the area surrounding the UE 215-a using one or more radar transmissions. After the one or more radar transmissions reflect off objects in the area surrounding the UE 215-a, the UE 215-a may receive the one or more radar transmissions. The UE 215-a may process and identify an amount of interference and/or physical information of the area surrounding UE 215-a, and may determine an operating mode to use accordingly. For example, the UE 215-a may determine that the amount of measured interference satisfies (e.g., is lower than) a threshold, and the UE 215-a may select an FD mode.

Additionally, the UE 215-a may transmit, to the base station 205 and/or one or more other UEs, such as UE 215-b, UE 215-c, etc., an indication including the identified physical and/or interference information. In such cases, the receiving device may use the information to determine an operating mode. For instance, UE 215-b (e.g., operating in the same zone 210-a as UE 215-a) may select between an FD and an HD mode based on an amount of interference in the zone 210-a as indicated by the UE 215-a. Likewise, the base station 205 may determine an operating mode for UE 215-a and any UEs 215 proximal to UE 215-a (e.g., UE 215-b, UE 215-c, etc.) based on the indication. Aspects of particular UE measurements and the environments in which they may be performed are described in more detail with reference to FIG. 3.

In some cases, UEs 215 may not be connected (e.g., Uu connected) to a base station 205, and may autonomously select an operating mode. For instance, UEs 215-e and 215-f may operate in zone 210-c and may not be connected to the base station 205. UEs 215-e and 215-f may thus select between HD mode and FD mode based on the zone 210-c. In some cases, UEs 215-e and 215-f may select an operating mode based on indications received from one or more other UEs 215 about the zone 210-c. Such indications may include, but are not limited to, an indication of the operating mode and zone of the other UE(s), an indication of an amount of interference in the zone, etc. As an example, UE 215-e may receive (e.g., via communication link 230-b), from UE 215-f, a message indicating that UE 215-f is operating in FD mode. The message may be received as part of sidelink control information (SCI) (e.g., stage-1 (SCI-1) or stage-2 (SCI-2)). UE 215-e may receive one or more other indications from other UEs 215 and may, based on the indications, determine the number of UEs 215 operating in FD mode in the zone 210-c. The UE 215-e may select between HD mode and FD mode if a threshold value is satisfied. For example, if the number of proximal UEs 215 operating in FD mode is greater than a threshold value, the UE 215-e may enable HD communications. If the number of proximal FD enabled UEs 215 is lesser than a threshold value, the UE 215-e may enable FD communications.

In some cases, a UE 215 may support a default operating mode. For instance, the UE 215 may be configured to operate using an HD mode. Thus, the methods described herein may be used to determine when the UE 215 may switch to an FD mode and when the UE 215 may revert to the default HD mode. Alternatively, the UE 215 may default to an FD mode, and the methods described herein may be used to determine when the UE 215 may switch to or from an HD operating mode.

Figure 3A:
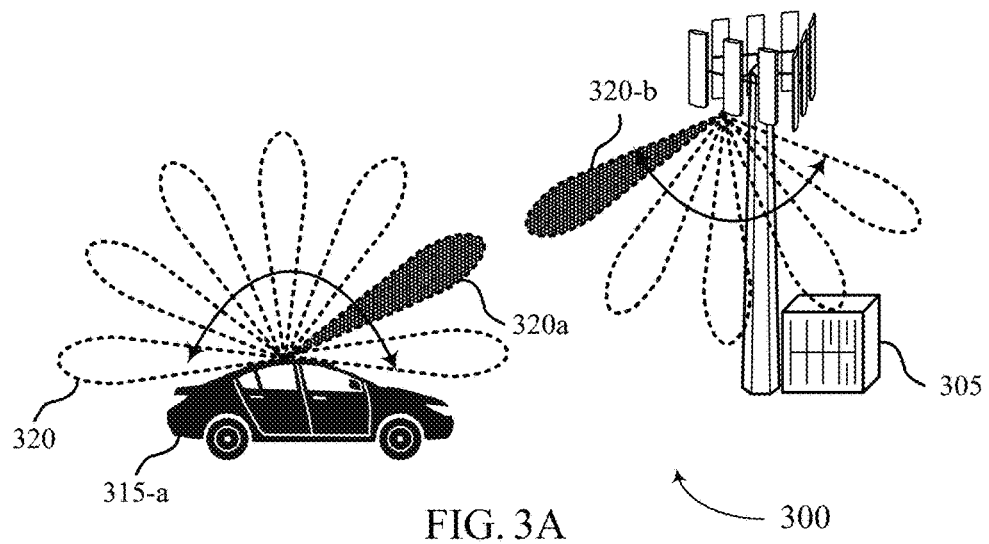
Figure 3B:
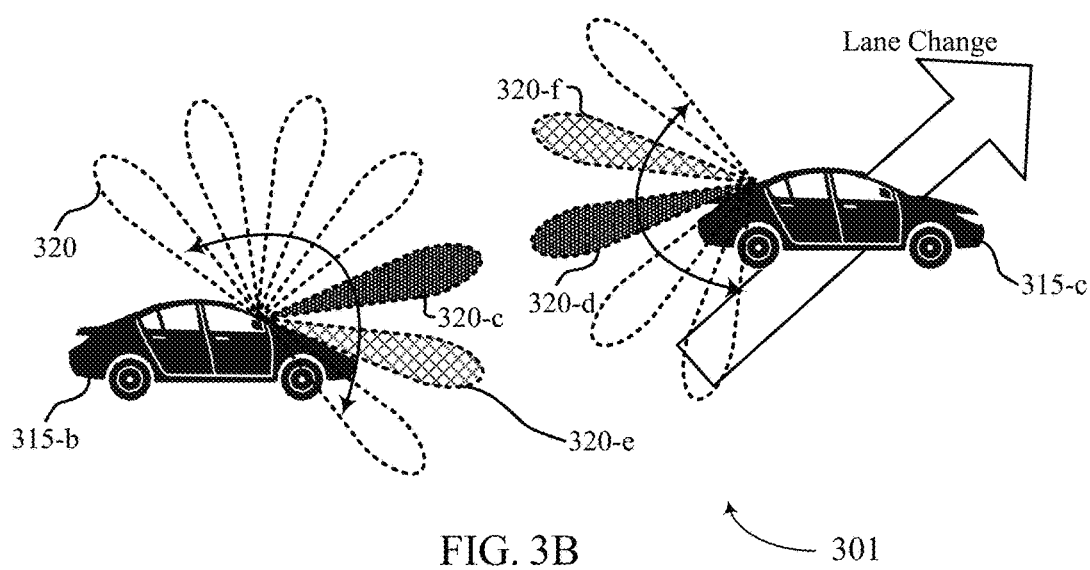
Figure 3C:
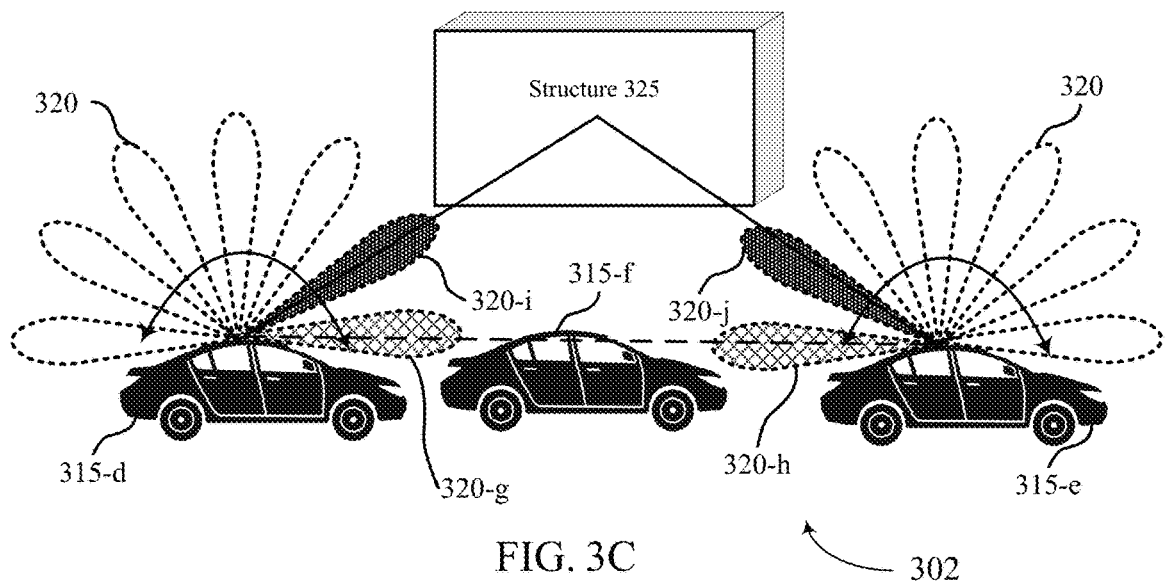

FIGS. 3A through 3C illustrate examples of wireless communications system 300, 301, and 302 that support zone based operating mode configuration in accordance with aspects of the present disclosure. In some examples, wireless communications systems 300, 301, and 302 may be supported in vehicle-to-everything (V2X) deployments, inter access backhaul (IAB) deployments, or the like, and may implement aspects of wireless communications systems 200 and 100. The wireless communications systems 300, 301, and 302 may each include a base station 305 and UEs 315, which may be examples of the corresponding devices described herein. For instance, base station 305 may be an example of a gNB, RSU, CU, DU, or the like. UEs 315 may be examples of vUEs, cell phones, mobile terminals, or any other wireless device supporting UE-like capabilities. Base station 305 and UEs 315 may be able to communicate directionally using one or more beams 320.

According to the techniques described herein, the base station 305 may determine a default operating mode based on a zone in which the base station 305 is located. The default operating mode may be determined based on an amount of interference in the zone, such as interference caused by static objects and/or signal blockages. The base station 305 may transmit (e.g., as control information) an indication of the default operating mode and, in some cases, associated operating parameters, to UEs 315 in the zone. Each UE 315 may select an operating mode (e.g., FD or HD) to use in the zone for communicating with the base station 305. The selected operating mode may be the same as or different from the default operating mode indicated by the base station 305. In some aspects, each UE 315 and/or the base station 305 may determine an operating mode based on measurements performed by one or more UEs 315.

In the example of FIG. 3A, the base station 305 may determine an FD mode as the default operating mode. For instance, the base station 305 may determine that UEs 315 operating in the zone may not suffer additional interference when operating in FD mode, and may utilize increased efficiency associated with FD mode. The base station 305 may transmit, to the UE 315-*a* and any other UEs 315 operating in the zone, control information indicating the default operating mode. In some cases, the base station 305 may also transmit control information indicating communication parameters associated with the default operating mode.

The UE 315-*a* may receive the indication of the default operating mode and may select (e.g., between FD and HD) an operating mode for communications with the base station 305. In some cases, the UE 315-*a* may select an operating mode based on performing one or more measurements, such as interference measurements or clutter measurements. For instance, UE 315-*a* may perform interference measurements of the area surrounding the UE 315-*a*. In particular, the UE 315-*a* may perform interference measurements for one or more beams 320. Based on the interference measurements, the UE 315-*a* may determine that the signal strength is greatest through beam 320-*a* and may communicate with the base station 305 using beam 320-*a*. Likewise, base station 305 may communicate with the UE 315-*a* using beam 320-*b*. In this case, as shown by the orientation of the chosen beams 320-*a* and 320-*b*, the UE 315-*a* and base station 305 communicate on a line of sight (LoS) channel. As such, based on the channel quality of the LoS channel, the UE 315-*a* may select FD mode, e.g., as there are no blockages or reflections that may increase self-interference when using an FD mode. Thus, UE 315-*a* and base station 305 may communicate with increased spectral efficiency associated with the FD mode.

In the example of FIG. 3B, the UEs 315-*b* and 315-*c* may communicate with one another according to a selected operating mode. The UEs 315-*b* and 315-*c* may receive an indication of an FD default operating mode for the zone in which the UEs 315 are operating. As illustrated, however, the UEs 315-*b* and 315-*c* may suffer increased interference, e.g., due to the close proximity of the UEs 315-*b* and 315-*c*, and may select an HD operating mode instead of the indicated FD default operating mode.

In some examples, the UEs 315-*b* and 315-*c* may perform one or more measurements (e.g., clutter measurements, interference measurements) and may select an operating mode based on the measurements. For instance, UE 315-*b* may perform interference measurements of the area surrounding the UE 315-*b* and UE 315-*c* may perform interference measurements of the area surrounding the UE 315-*c*. Additionally, or alternatively, the UEs 315-*b* and 315-*c* may perform measurements to determine a best beam 320 to use for communications with one another. Based on the measurements, the UE 315-*b* may determine that beam 320-*c* is the best beam for communicating with UE 315-*c*. Likewise, UE 315-*c* may determine beam 320-*d* is the best beam with which to communicate with the UE 315-*b*.

In some cases, the UEs 315-*b* and 315-*c* may transmit an indication of an operating mode, a measurement report, or some combination thereof, to one another. For instance, the UE 315-*b* may take measurements and report interference information to the UE 315-*c*. The UE 315-*b* may also indicate the operating mode of the UE 315-*b*.

In some cases, UEs 315-*b* and 315-*c* may be mobile. For example, UE 315-*c* may be a vehicle UE and may change locations (e.g., change lanes) and may increase the distance between UE 315-*c* and UE 315-*b*. In this case, the previously selected beams 320-*c* and 320-*d* may no longer be the best beams for communication. Additionally, or alternatively, the previously-selected operating mode may not be the most appropriate operating mode. As such, UEs 315-*b* and 315-*c* may perform additional interference measurements. Based on the interference measurements post-lane change, the UEs 315-*b* and 315-*c* may determine new best beams and, in some cases, select a different operating mode. As illustrated, UE 315-*b* may determine that beam 320-*e* may be the new best beam for communicating with the UE 315-*c*. Likewise, UE 315-*c* may determine that the beam 320-*f* is now the best beam for communicating with the UE 315-*b*. Additionally, the UE 315-*b* and the UE 315-*c* may determine that there is less interference (e.g., due to the increased distance between the UEs 315-*b* and 315-*c*), and both UEs 315-*b* and 315-*c* may select FD mode.

In the example of FIG. 3C, UEs 315-*d*, 315-*f*, and 315-*e* may communicate with one another according to a selected operating mode. As illustrated, the UEs 315-*d*, 315-*f*, and 315-*e* may suffer increased interference, e.g., due to the close proximity of the UEs 315-*d*, 315-*f*, and 315-*e*, and a structure 325.

In some aspects, the UE 315-*d* and UE 315-*e* may select an operating mode based on UE 315 measurements. For instance, UE 315-*d* may perform interference measurements of the area surrounding the UE 315-*d* and UE 315-*e* may perform interference measurements of the area surrounding the UE 315-*e*. Additionally, the UEs 315-*d* and 315-*e* may determine a best beam for communicating with one another. The UE 315-*d* may determine that beam 320-*g* is the best beam for communicating with UE 315-*e*. Likewise, UE 315-*e* may determine that beam 320-*h* is the best beam for communicating with the UE 315-*d*.

In some cases, UE 315-*f* may change locations, blocking the signal between chosen beams 320-*g* and 320-*h*. The UEs 315-*d* and 315-*e* may be unable to communicate with one another via beams 320-*g* and 320-*h*, respectively, as UE 315-*f* may block an LoS channel between the beams 320-*g* and 320-*h*. In this case, the previously selected beams 320-*g* and 320-*h* may no longer be the best beams. Additionally, the previously selected operating mode may no longer be the most appropriate operating mode for the UEs 315-*d* and 315-E.

As such, UEs 315-*d* and 315-*e* may perform additional interference measurements of the area surrounding each of UE 315-*d* and UE 315-*e*. Based on the interference measurements post-blockage, the UE 315-*d* may determine a new best beam 320-*i* for communicating with the UE 315-*e*. Likewise, UE 315-*e* may determine that beam 320-*j* is the best beam for communicating with the UE 315-*d*. In this case, as shown by the orientation of the chosen beams 320-*i* and 320-*j*, the UE 315-*d* and the UE 315-*e* may communicate on a non-line of sight (NLoS) channel. An NLoS channel may rely on reflections from physical objects (e.g., buildings, semi-truck trailers, etc.) for the transmission and reception of data. For instance, UE 315-*d* may transmit a data packet to UE 315-*e* through beam 320-*i*. The data packet may reflect off of structure 325 towards beam 320-*j* of UE 315-*e*.

Based on the channel quality of the NLoS channel and to mitigate self-interference, the UE 315-*d* and the UE 315-*e* may select HD mode on the chosen beams 320-*i* and 320-*j*. If the UEs 315 instead select an FD mode and transmit a data packet, the data packet may reflect off structure 325, return to the UE 315, and cause interference at the receiver of the UE 315. Thus, UE 315-*b* and UE 315-*c* may select HD mode for lower self-interference and more reliable communication.

Figure 4:
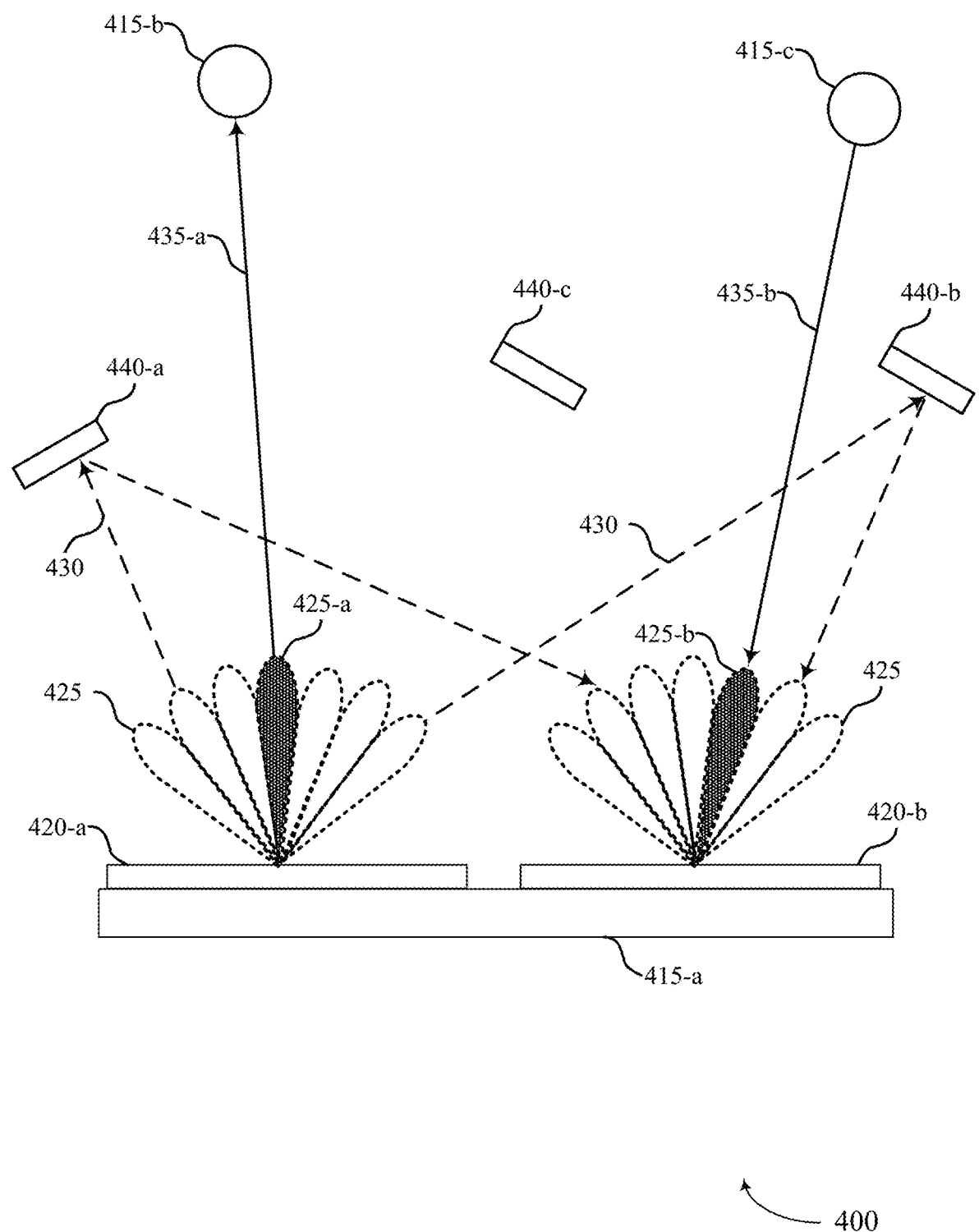

FIG. 4 illustrates an example of a wireless communications system 400 that supports zone based operating mode configuration in accordance with aspects of the present disclosure. In some examples, wireless communications system 400 may implement aspects of wireless communications systems 100, 200, or 300. For instance, the wireless communications system 400 may include UEs 415, which may be examples of corresponding devices as described with reference to FIGS. 1 through 3. UEs 415 may be able to communicate with one another via one or more antennas 420. The one or more antennas may be able to transmit and receive signals directionally through one or more beams 425.

In some cases, UE 415-*a* may determine to perform one or more interference measurements of the environment surrounding UE 415-*a* (e.g., the zone in which UE 415-*a* operates). As described herein, the UE 415-*a* may perform interference measurements to determine an operating mode (e.g., FD or HD). For instance, UE 415-*a*, including antennas 420-*a* and 420-*b*, may transmit a signal 435-*a* from antenna 420-*a* to UE 415-*b*. The transmission of signal 435-*a* may also result in the transmission of signals 430 (e.g., due to leakage, etc.) which may reflect off structures 440-*a* and 440-*b* (e.g., a building, a car, a semi-truck trailer, etc.) and redirect toward antenna 420-*b*, which may be attempting to receive a signal 435-*b* from UE 415-*c*. These reflections from signals 430 may cause interference at the antenna 420-*b*, which may reduce the signal quality of the received signal 435-*b*. The UE 415-*a* may measure the interference experienced at antenna 420-*a* as a result of the transmission of signal 435-*a*. As the UE 415-*a* completes more interference measurements, the UE 415-*a* may develop a better representation of the environment surrounding UE 415-*a*. In some examples, the interference measurements may include determining main and null communication directions. For instance, if UE 415-*a* is to communicate with UE 415-*b*, UE 415-*a* may complete interference measurements on one or more beams 425. In this case, UE 415-*a* may determine that the communication direction corresponding to beam 425-*a* has the greatest signal quality, strength, or some combination thereof. As shown, UE 415-*a* may transmit, using beam 425-*a*, along an LoS channel 435-*a* to UE 415-*b*.

In some cases, UE 415-*a* may transmit interference information to UE 415-*b*. The transmitted interference information may be based on the UE 415-*a* interference measurements. Additionally, or alternatively, the interference information may include the determined main and null communication directions. The main and null directions may be denoted as an index within a codebook corresponding to precoding vectors of which UEs 415-*a* and 415-*b* are both familiar. Further, the interference information may be transmitted to one or more base stations, such as base station 315 as described with reference to FIG. 3.

In some cases, UE 415-*a* may receive interference information from UE 415-*c*. The received interference information may be based on the UE 415-*c* interference measurements. Additionally, or alternatively, the interference information may include UE 415-*c* determined main and null communication directions. The main and null directions may be denoted as an index within a codebook corresponding to precoding vectors of which UEs 415-*a* and 415-*b* are both familiar.

A UE 415-*a* may determine an operating mode (e.g., FD or HD) based on the interference information obtained from performing the measurements, the interference information received from one or more other UEs 415, or both. As an example, UE 415-*a* may perform one or more interference measurements as described herein. UE 415-*a* may also receive interference information from UE 415-*c*. Accordingly, the UE 415-*a* may select an HD operating mode for communicating in the environment surrounding UE 415-*a*. Alternatively, the UE 415-*a* may determine that structures 440-*a*, 440-*b*, and 440-*c* may not present additional interference, for example, if the UE 415-*a* transmits to UE 415-*b* and/or receives from UE 415-*c*. The UE 415-*a* may select an FD operating mode accordingly.

In some cases, the mode of operation may affect the measurements performed by UE 415-*a* or the type of measurements performed by the UE 415-*a* or instructed to the UE 415-*a* may affect or infer the mode of operation. For instance, a base station, such as base station 305 as described with reference to FIG. 3, may indicate, to UE 415-*a*, that UE 415-*a* may perform limited interference measurements. In particular, UE 415-*a* may perform interference measurements during fewer time slots compared to a default number of interference measurement time slots. The default number of measurement time slots may be predetermined or indicated otherwise. The limited sensing measurements (e.g., as compared to the default number of slots) may infer the presence of an interference or clutter level in the environment to determine the feasibility of FD mode of operation.

Alternatively, the base station may indicate, to UE 415-a, that UE 415-a may perform additional interference measurements. As such, the UE 415-a may perform interference measurements during more time slots compared to a default number of interference measurement time slots. The additional or increased interference measurements may infer the level of interference or clutter to determine the feasibility of FD mode of operation.

Figure 5:
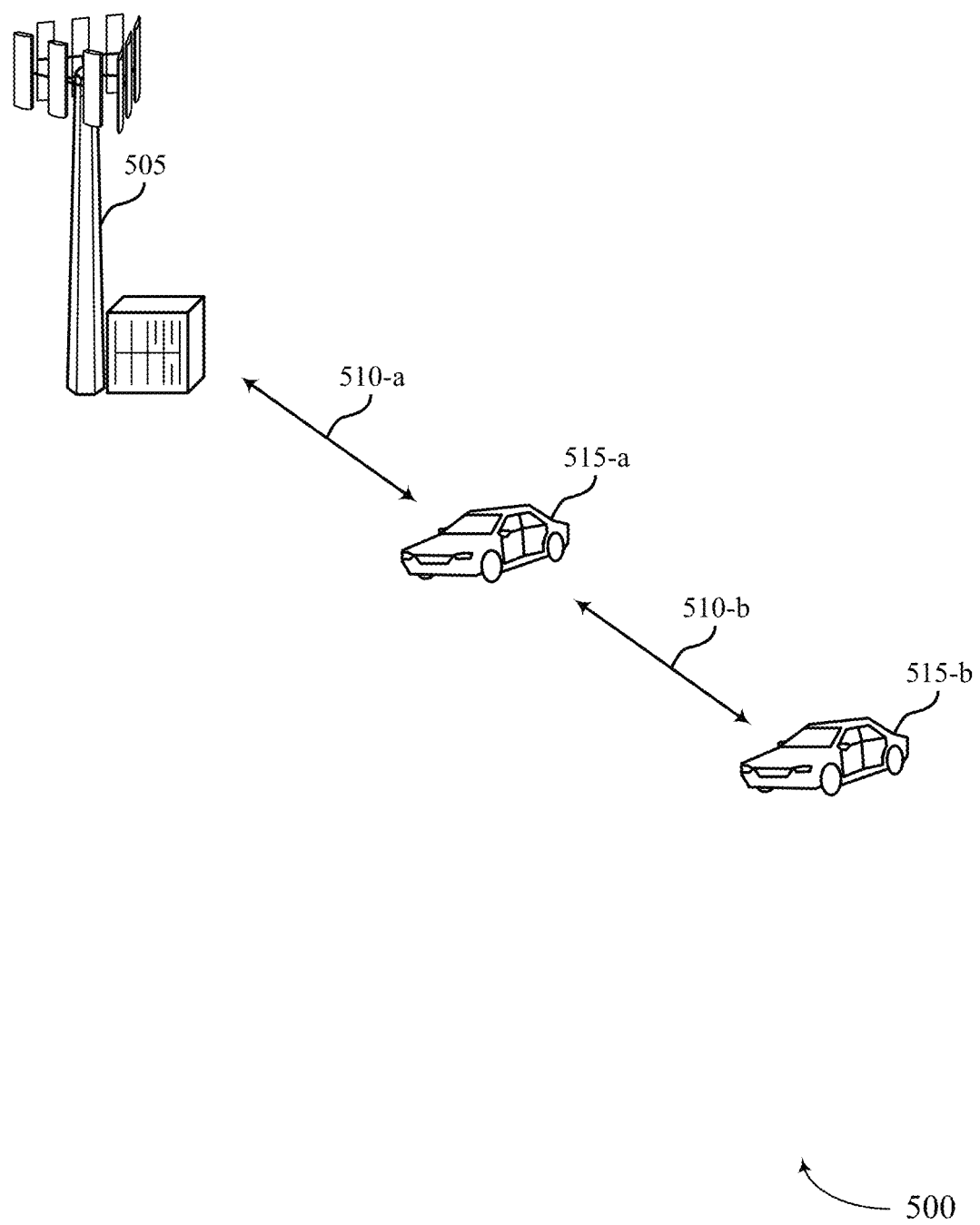

FIG. 5 illustrates an example of a wireless communications system 500 that supports zone based operating mode configuration in accordance with aspects of the present disclosure. In some examples, wireless communications system 500 may implement aspects of wireless communications systems 100 through 400, as described with reference to FIGS. 1 through 4. The wireless communications system 500 may include a base station 505 and wireless devices 515, which may be examples of the corresponding devices as described herein.

UEs 515-a and 515-b may operate according to a selected operating mode (e.g., FD or HD) as described herein. The selected operating mode may be the same as or different from a default operating mode indicated by the base station 505. In the example of FIG. 5, selecting between FD or HD mode may be based on relative UE 515 velocity requirements. For instance, base station 505 may be stationary, but UE 515-a and UE 515-b may be mobile. The UE 515-a may be configured with FD mode to simultaneously transmit data to base station 505 via communication link 510-a and receive data from UE 515-b via communication link 510-b. The UE 515-a may perform a measurement to determine the relative velocity between UE 515-a and base station 505. If the relative velocity between the UE 515-a and the base station 505 satisfies a relative velocity threshold, the UE 515-a may select HD mode, as FD mode may cause reduced communications performance between the mobile UE 515-a and the base station 505. The relative velocity threshold may be based on a predefined value, an indication from base station 505, or may be determined by the UE 515-a.

Additionally, the UE 515-a may perform a measurement to determine the relative velocity between the UE 515-a and the UE 515-b. If the relative velocity between UE 515-a and UE 515-b satisfies a relative velocity threshold, the UE 515-a may enable HD mode, as FD mode may cause reduced communications performance between the mobile UEs 515. The relative velocity threshold may be based on a predefined value, an indication from base station 505, an indication from UE 515-b, or self-determined by the UE 515-a. In some cases, the relative velocities between UE 515-a and base station 505 and UE 515-a and UE 515-b may not satisfy the relative velocity threshold. As such, the UE 515-a may continue to use FD mode.

In some cases, selecting the operating mode (e.g., FD or HD mode) may be based on QoS requirements. For instance, UE 515-a may operate in an FD mode to simultaneously communicate with base station 505 through communication link 510-a and with UE 515-b through communication link 510-b. UE 515-a may perform a QoS measurement on the communication link 510-a between UE 515-a and base station 505. If the QoS measurement satisfies a QoS threshold, the UE 515-a may select an FD mode. For example, the QoS measurement may indicate that the QoS of the communication link 510-a is sufficient to support FD communications without reducing communication performance. The QoS threshold may be based on a predefined value or an indication from the base station 505, or may be determined at the UE 515-a. Additionally, or alternatively, base station 505 may perform the QoS measurement and determine an operating mode for UE 515-a therefrom. Further, the UE 515-a may perform a QoS measurement on the communication link 510-b between UE 515-a and UE 515-b. If the QoS measurement satisfies a QoS threshold, the UE 515-a may select an FD mode. The QoS threshold may be based on a predefined value, an indication from the base station 505 or an indication from the UE 515-b, or may be determined UE 515-a. In some cases, the QoS measurements on both communication links 510-a and 510-b may not satisfy the QoS threshold, and the UE 515-a may select an HD mode.

Figure 6:
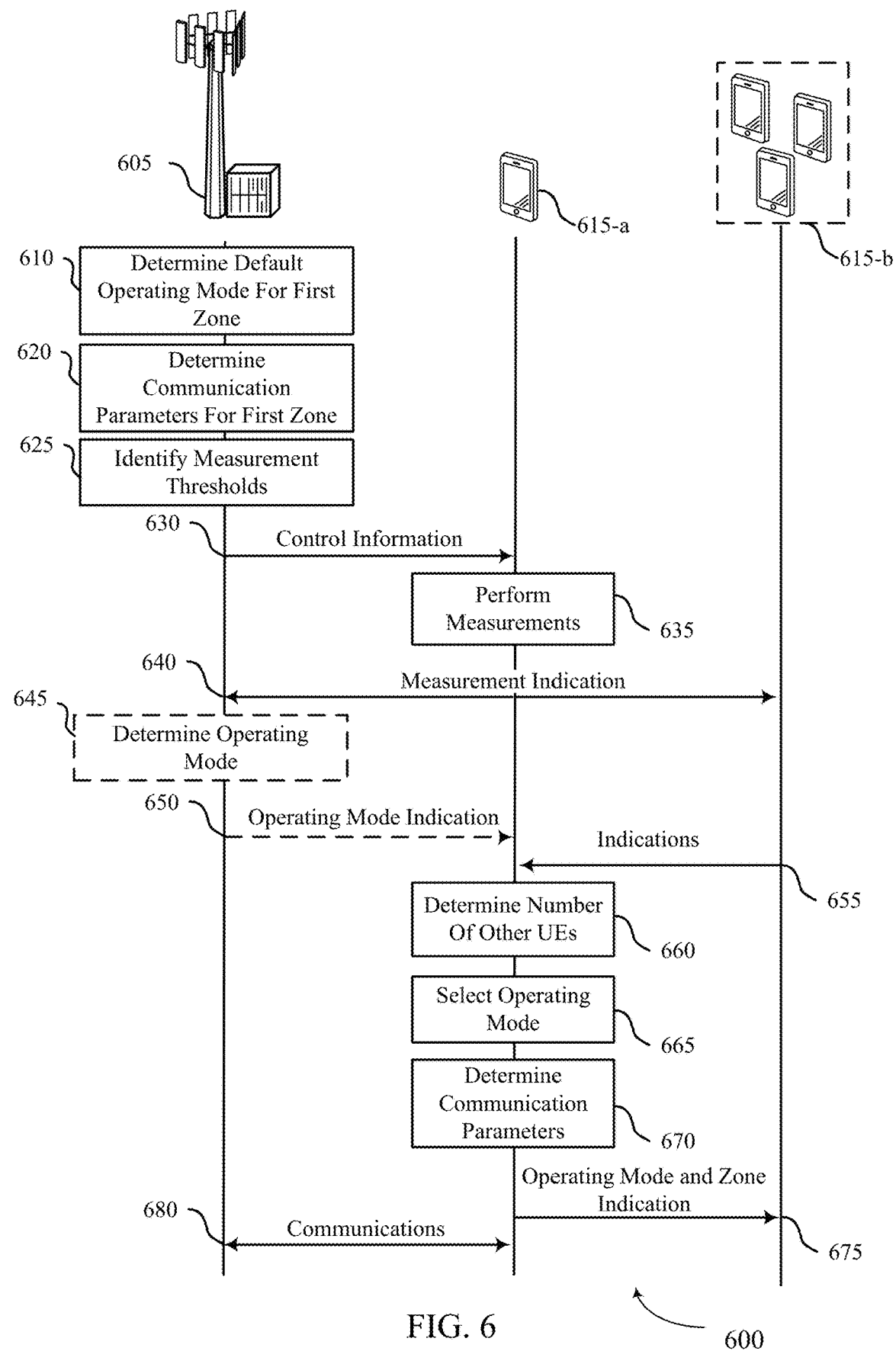
FIG. 6 illustrates an example of a process flow that supports zone based operating mode configuration in accordance with aspects of the present disclosure.

FIG. 6 illustrates an example of a process flow 600 that supports zone based operating mode configuration in accordance with aspects of the present disclosure. Process flow 600 may include UEs 615 and a base station 605, which may be examples of the corresponding wireless devices described herein. It is to be understood that references to specific wireless devices (e.g., UEs or base stations) in the process flow 600 are provided for illustrative purposes, and different wireless devices not specifically referred to herein may be used interchangeably with those described herein. Likewise, the described operations performed by a UE 615 may, in some cases, be performed by a base station 605, and vice versa. In some examples, the base station 605 may be examples of, or include, one or more TRPs. Additionally or alternatively, the base station 605 may be an example of an IAB node, a repeater node (e.g., configured with some retransmission capability), an RSU, or the like. Further, the UEs 615 may be examples of a vUE, a repeater node, or the like.

In the following description of the process flow 600, the operations between the UEs 615 and the base station 605 may be transmitted in a different order than the exemplary order shown, or the operations performed by the UEs 615 and the base station 605 may be performed in different orders or at different times. Certain operations may also be left out of the process flow 600, or other operations may be added to the process flow 600.

UE 615-a may be located in a first zone which may correspond to a zone associated with base station 605. In some cases, the UE 615-a may be connected to the base station 605 via a Uu interface. Additionally, or alternatively, the UE 615-a may be connected to one or more UEs 615-b via one or more communication links (e.g., sidelinks).

At 610, the base station 605 may determine a default operating mode (e.g., FD mode or HD mode) for the first zone. In some cases, the base station 605 may determine the default operating mode based on the geographic location of the zone (e.g., a cell edge, a cell center, a crossroads, etc.). Additionally or alternatively, the base station 605 may determine the default operating mode based on the density of UEs 615 in the first zone, the number of UEs 615 in the first zone, an amount of interference in the first zone, a signal density in the first zone, or a combination thereof.

At 620, the base station 605 may determine one or more communication parameters corresponding to the first zone. The communication parameters may include a beam, a beam direction, an MCS, a number of layers, a power configuration, a timing configuration, or a combination thereof. In some examples, the one or more communication parameters may correspond to a certain operating mode (e.g., the default operating mode for the first zone). For instance, a UE 615 operating in FD mode may be configured with a first set of communication parameters which may be different from a second set of communication parameters corresponding to a UE 615 operating in HD mode.

At 625, the base station 605 may identify one or more measurement thresholds for UEs 615. In some cases, the measurement thresholds may include an RSRP threshold, a relative velocity threshold, a QoS threshold, or any combination thereof. Additionally, or alternatively, the base station 605 may determine a measurement threshold corresponding to the number of UEs 615 that have enabled FD mode and are proximal to UE 615-*a*.

At 630, the base station 605 may transmit control information to UE 615-*a*. In some cases, the base station 605 may transmit the control information via an SIB. In other cases, the base station 605 may transmit the control information via an upper layer (e.g., application layer) or lower layer (e.g., physical layer) message. The base station may include the default operating mode corresponding to the first zone, the respective one or more communication parameters, and an indication including one or more measurement thresholds in the control information.

At 635, the UE 615-*a* may perform one or more measurements to determine an amount of interference in the first zone. In some examples, the measurements may be interference measurements, clutter measurements, or some combination thereof. For instance, the UE 615-*a* may transmit one or more signals to the area surrounding 615-*a*. As such, the signals may reflect off of objects in the area towards UE 615-*a*. The UE 615-*a* may receive the signals and may determine the number, proximity, velocity, and orientation of the objects in its vicinity.

Further, the UE 615-*a* may perform an RSRP measurement on reference signals from the base station 605. The UE 615-*a* may additionally perform QoS measurements on one or more communication channels corresponding to base station 605, UEs 615-*b* or any combination thereof. Moreover, the UE 615-*a* may perform relative velocity measurements between UE 615-*a* and one or more of the base stations 605 and one or more UEs 615-*b*. Here, UE 615-*a* may compare the RSRP, QoS, and relative velocity measurements to the measurement thresholds as indicated in the control information at 630. The measurement thresholds may be threshold values such that if a UE 615 measures a RSRP, relative velocity, or QoS which satisfies the respective measurement thresholds, the UE 615 may determine to switch operating modes. For instance, if a UE 615 is traveling away from the base station 605, the UE 615 may measure a relative velocity between the UE 615 and the base station 605 that is higher than the respective measurement threshold. As such, the UE 615 may select an operating mode (e.g., HD mode) that avoids reduced communication performance associated with an increased relative velocity.

At 640, the UE 615-*a* may transmit a measurement indication to the base station 605 and the UEs 615-*b*. The measurement indication may include information corresponding to the interference and clutter measurements, the QoS measurements, the RSRP measurements, the relative velocity measurements, or the like.

At 645 the base station 605 may determine the operating mode for the UE 615-*a*. The base station 605 may determine the operating mode based on the measurement indication transmitted by the UE 615-*a* (e.g., at 640). In some cases, the determined operating mode may be a different operating mode than the default operating mode for the first zone as determined at 610. In some examples, the operating mode indication may be based on the subscription level of the UE 615-*a*. For instance, UE 615-*a* may operate according to a first service provider, and the base station 605 may have an operating mode specified for the first service provider.

At 650, the base station may transmit an operating mode indication to the UE 615-*a* indicating the determined operating mode for the UE 615-*a* to use. The operating mode indication may, in some examples, include communication parameters associated with the determined operating mode.

At 655, one or more UEs 615-*b* may transmit, and the UE 615-*a* may receive, one or more indications of their operating modes and zones. For instance, the UEs 615-*b* may be located in the first zone, a second zone different from the first zone, or both. One or more UEs 615-*b* may also transmit measurement indications including an indication of amount of interference in the zone in which the UE 615-*b* is operating.

At 660, the UE 615-*a* may determine the number of other UEs 615-*b* located in the first zone operating in FD mode based on the indications received from UEs 615-*b* (e.g., at 655). In some examples, the UE 615-*a* may compare the number of other UEs 615-*b* located in the first zone operating in FD mode with the respective measurement threshold as provided by the base station 605 at 625.

At 665, the UE 615-*a* may select between FD and HD modes. In some cases, the UE may select the operating mode based on the operating mode indication received at 650 from the base station 605. In some examples, the UE 615-*a* may select the operating mode based on interference information, e.g., received from one or more UEs 615-*b* at 655 or performed by the UE 615-*a* at 635. For instance, the UE 615-*a* may select the operating mode based on determining whether one or more measurement thresholds have been satisfied. For example, if, at 660, the UE 615-*a* determines that the number of other UEs 615-*b* located in the first zone operating in FD mode satisfies the threshold value, the UE 615-*a* may select an HD operating mode.

At 670, the UE 615-*a* may determine the communication parameters corresponding to the selected operating mode at 665. The communication parameters may be specified in the control information as reported by the base station at 630 or may be independently determined by the UE 615-*a*.

At 675, the UE 615-*a* may transmit an indication of the selected operating mode as well as the zone the UE 615-*a* is located in to one or more other UEs 615-*b*, e.g., for the UEs 615-*b* to use in selecting respective operating modes.

At 680, the UE 615-*a* may communicate with base station 605 based on the selected operating mode.

Figure 7:
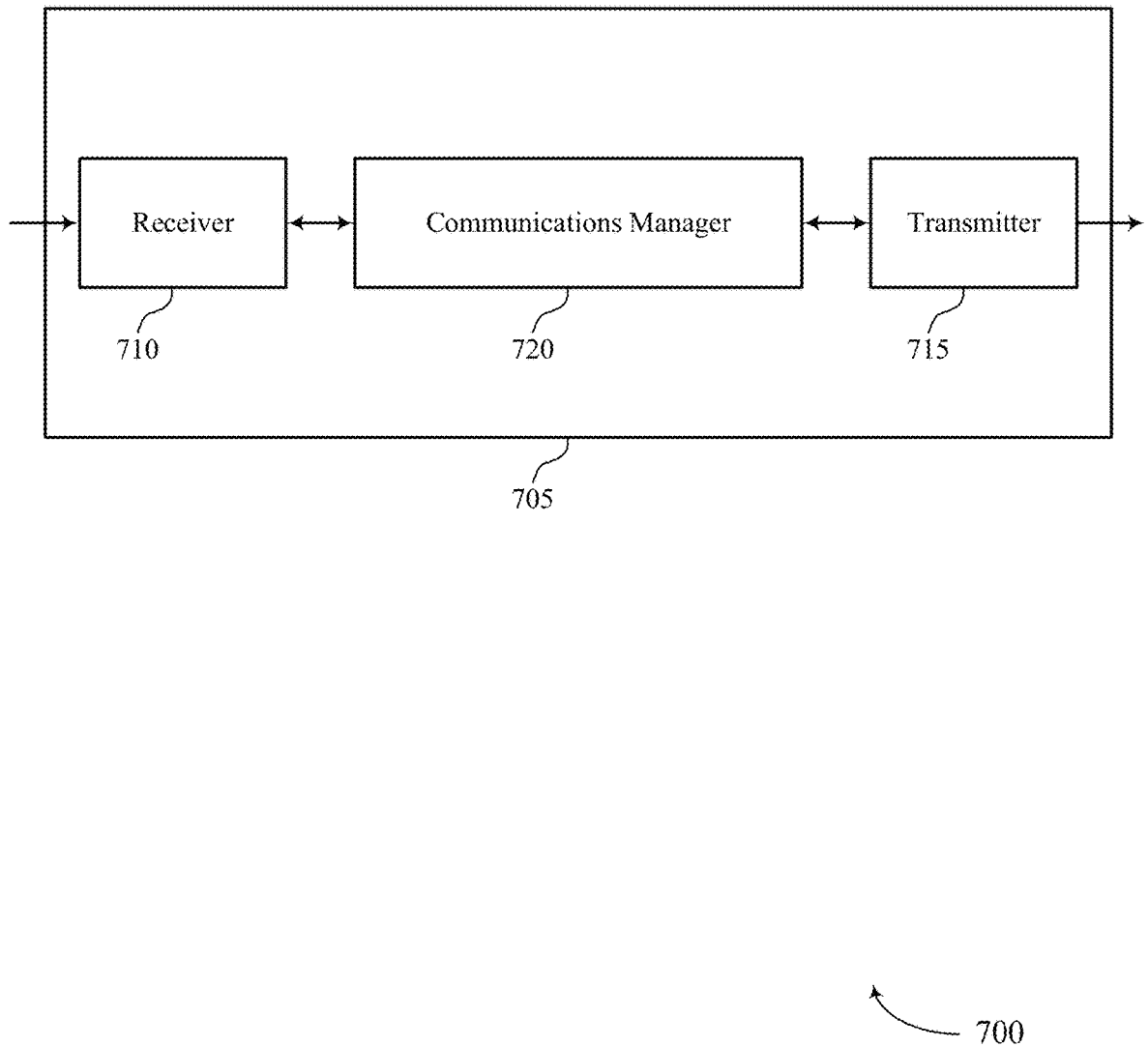
FIGS. 7 and 8 show block diagrams of devices that support zone based operating mode configuration in accordance with aspects of the present disclosure.

FIG. 7 shows a block diagram 700 of a device 705 that supports zone based operating mode configuration in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to zone based operating mode configuration). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to zone based operating mode configuration). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of zone based operating mode configuration as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period. The communications manager 720 may be configured as or otherwise support a means for selecting between the full duplex mode and the half duplex mode as an operating mode for the UE in the zone based on the default operating mode for the zone. The communications manager 720 may be configured as or otherwise support a means for communicating with a base station according to the selected operating mode.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for selecting between full duplex mode and half duplex mode. Switching between full duplex mode and half duplex mode may enable the device 705 to adaptively optimize communications based on the operating zone of the device 705. For example, in a high-interference zone, the device 705 may use HD mode to reduce the likelihood of self-interference and increase the reliability of transmissions. In a low-interference zone, the device 705 may use FD mode, which may result in increased spectral efficiency and overall enhanced communication performance.

Figure 8:
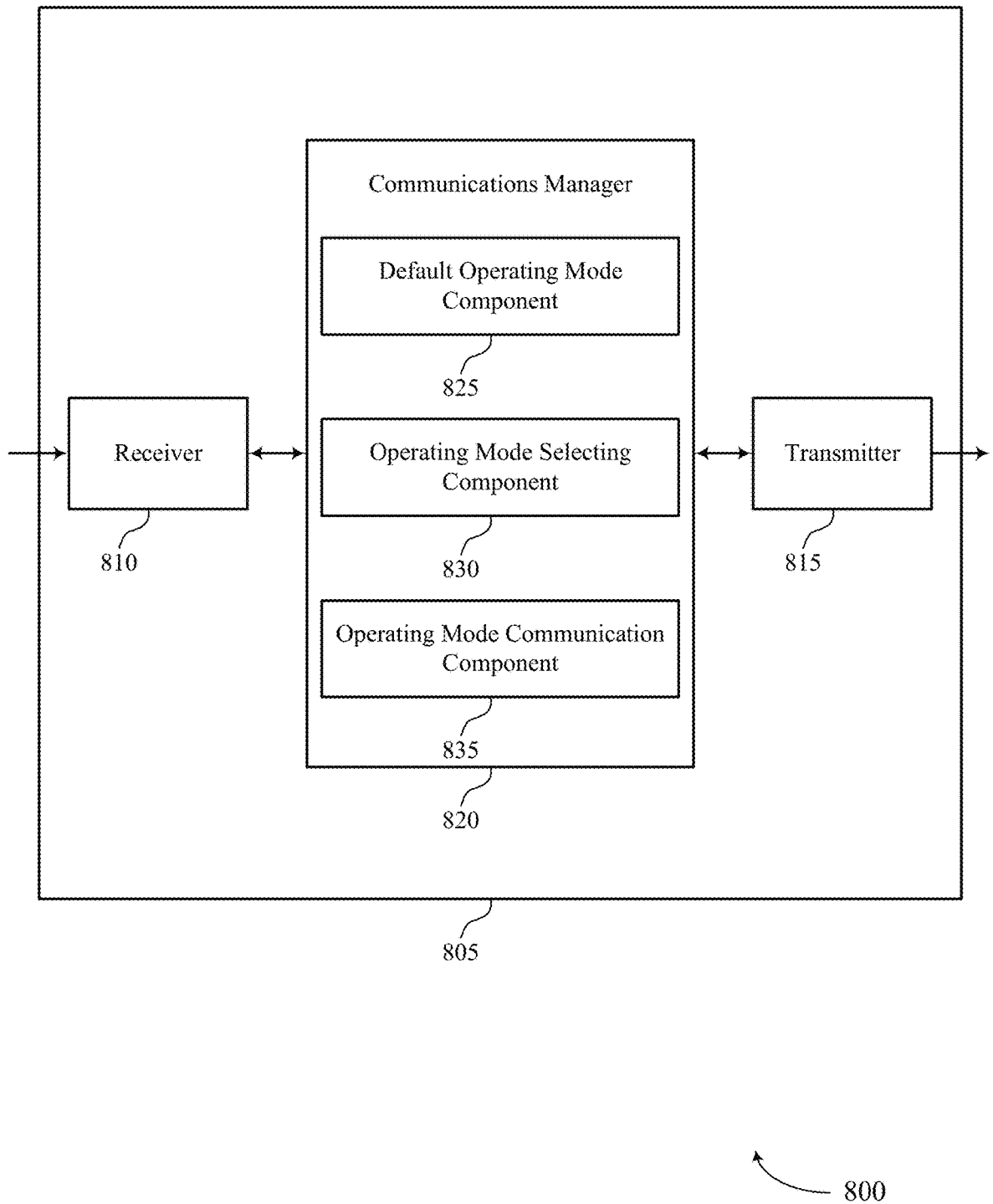

FIG. 8 shows a block diagram 800 of a device 805 that supports zone based operating mode configuration in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to zone based operating mode configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to zone based operating mode configuration). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of zone based operating mode configuration as described herein. For example, the communications manager 820 may include a default operating mode component 825, an operating mode selecting component 830, an operating mode communication component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The default operating mode component

825 may be configured as or otherwise support a means for receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period. The operating mode selecting component 830 may be configured as or otherwise support a means for selecting between the full duplex mode and the half duplex mode as an operating mode for the UE in the zone based on the default operating mode for the zone. The operating mode communication component 835 may be configured as or otherwise support a means for communicating with a base station according to the selected operating mode.

Figure 9:
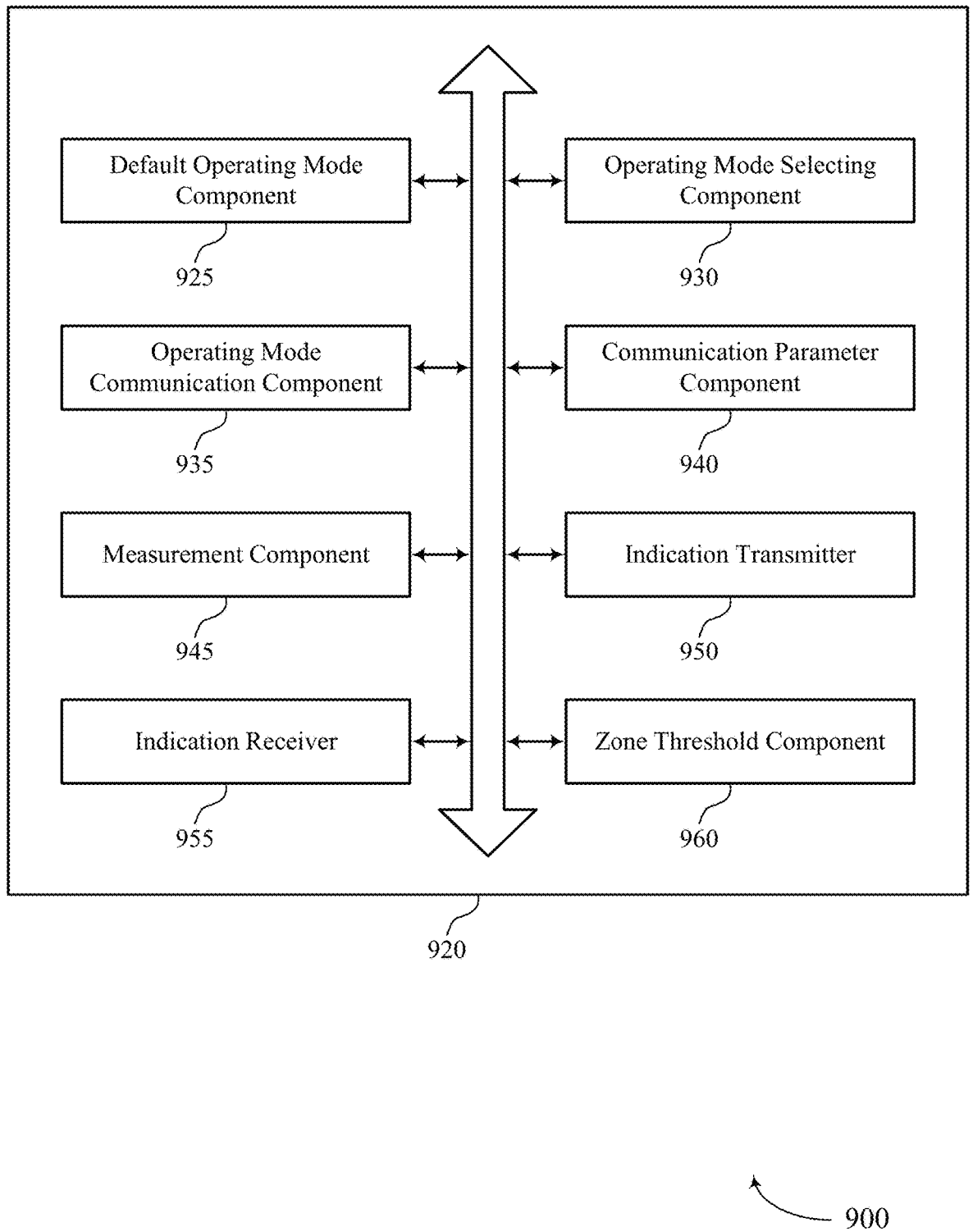
FIG. 9 shows a block diagram of a communications manager that supports zone based operating mode configuration in accordance with aspects of the present disclosure.

FIG. 9 shows a block diagram 900 of a communications manager 920 that supports zone based operating mode configuration in accordance with aspects of the present disclosure. The communications manager 920 may be an example of aspects of a communications manager 720, a communications manager 820, or both, as described herein. The communications manager 920, or various components thereof, may be an example of means for performing various aspects of zone based operating mode configuration as described herein. For example, the communications manager 920 may include a default operating mode component 925, an operating mode selecting component 930, an operating mode communication component 935, a communication parameter component 940, a measurement component 945, an indication transmitter 950, an indication receiver 955, a zone threshold component 960, or any combination thereof. Each of these components may communicate, directly or indirectly, with one another (e.g., via one or more buses).

The communications manager 920 may support wireless communication at a UE in accordance with examples as disclosed herein. The default operating mode component 925 may be configured as or otherwise support a means for receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period. In some examples, the default operating mode component 925 may be configured as or otherwise support a means for receiving control information via an SIB. The operating mode selecting component 930 may be configured as or otherwise support a means for selecting between the full duplex mode and the half duplex mode as an operating mode for the UE in the zone based on the default operating mode for the zone. The operating mode communication component 935 may be configured as or otherwise support a means for communicating with a base station according to the selected operating mode.

In some examples, the communication parameter component 940 may be configured as or otherwise support a means for determining one or more communication parameters associated with the operating mode. In some examples, to support determining the one or more communication parameters, the communication parameter component 940 may be configured as or otherwise support a means for receiving control information indicating the one or more communication parameters associated with the operating mode. In some examples, the one or more communication parameters include a beam, a beam direction, a modulation and coding scheme, a number of layers, a power configuration, a timing configuration, or a combination thereof.

In some examples, to support selecting between the full duplex mode and the half duplex mode, the operating mode selecting component 930 may be configured as or otherwise support a means for receiving control information indicating the operating mode.

In some examples, to support selecting between the full duplex mode and the half duplex mode, the measurement component 945 may be configured as or otherwise support a means for performing measurements to determine an amount of interference in the zone. In some examples, to support selecting between the full duplex mode and the half duplex mode, the operating mode selecting component 930 may be configured as or otherwise support a means for selecting the operating mode based on the performing the measurements. In some examples, to support selecting between the full duplex mode and the half duplex mode, the indication transmitter 950 may be configured as or otherwise support a means for transmitting a measurement indication including an indication of the amount of interference in the zone. In some examples, the measurements include a clutter measurement, an interference measurement, or some combination thereof.

In some examples, the operating mode is different than the default operating mode.

In some examples, the indication receiver 955 may be configured as or otherwise support a means for receiving a measurement indication including an indication of an amount of interference in the zone, where the operating mode is selected based on receiving the measurement indication.

In some examples, the indication transmitter 950 may be configured as or otherwise support a means for transmitting, to one or more other UEs in the zone, an indication of the operating mode and an indication of the zone.

In some examples, to support selecting between the full duplex mode and the half duplex mode, the indication receiver 955 may be configured as or otherwise support a means for receiving one or more indications from one or more other UEs indicating the operating modes and zones of the one or more other UEs. In some examples, to support selecting between the full duplex mode and the half duplex mode, the zone threshold component 960 may be configured as or otherwise support a means for determining, based on the one or more received indications, a number of other UEs in the zone that are operating in the full duplex mode. In some examples, to support selecting between the full duplex mode and the half duplex mode, the zone threshold component 960 may be configured as or otherwise support a means for determining whether the number of other UEs in the zone that are operating in the full duplex mode satisfies a threshold.

In some examples, selecting between the full duplex mode and the half duplex mode is based on a relative velocity between the UE and a second UE and a quality of service requirement. In some examples, selecting between the full duplex mode and the half duplex mode is based on a reference signal received power (RSRP) measurement.

Figure 10:
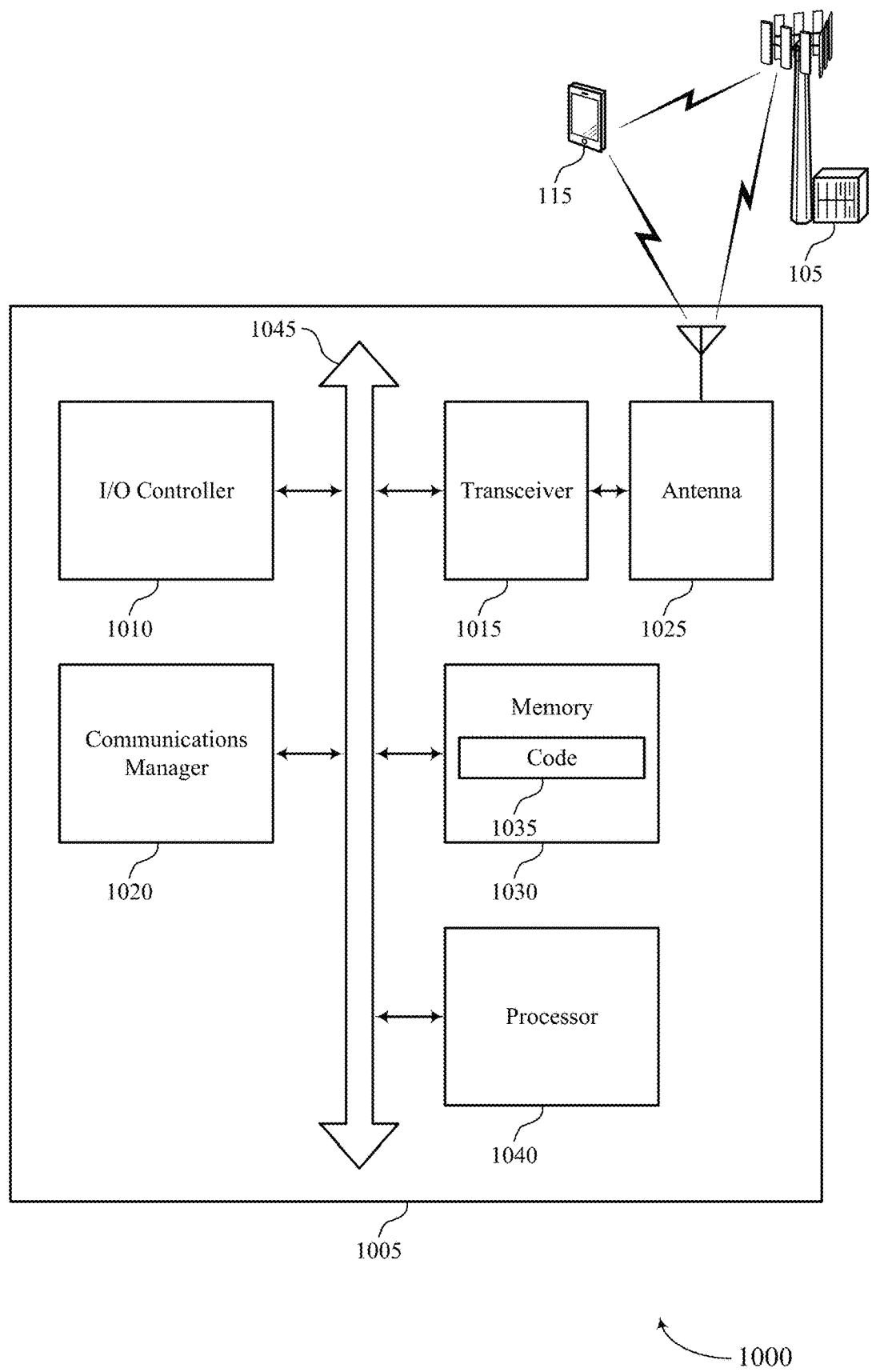
FIG. 10 shows a diagram of a system including a device that supports zone based operating mode configuration in accordance with aspects of the present disclosure.

FIG. 10 shows a diagram of a system 1000 including a device 1005 that supports zone based operating mode configuration in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting zone based operating mode configuration). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period. The communications manager 1020 may be configured as or otherwise support a means for selecting between the full duplex mode and the half duplex mode as an operating mode for the UE in the zone based on the default operating mode for the zone. The communications manager 1020 may be configured as or otherwise support a means for communicating with a base station according to the selected operating mode.

By including or configuring the communications manager 1020 in accordance with examples as described herein, the device 1005 may support techniques for switching between full duplex mode and half duplex mode, which may enable the device 1005 to select an operating mode based on the location of the device 1005. For example, in a high-interference zone, the device 1005 may use HD mode to reduce the likelihood of self-interference and increase the reliability of transmissions. In a low-interference zone, the device 1005 may use FD mode, which may increase spectral efficiency and overall communications performance. By switching between operating modes, the device 1005 may increase throughput and reduce latency (e.g., by avoiding interference), which may in turn result in enhanced system efficiency and heightened battery power preservation.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of zone based operating mode configuration as described herein, or the processor 1040 and the memory 1030 may be otherwise configured to perform or support such operations.

Figure 11:
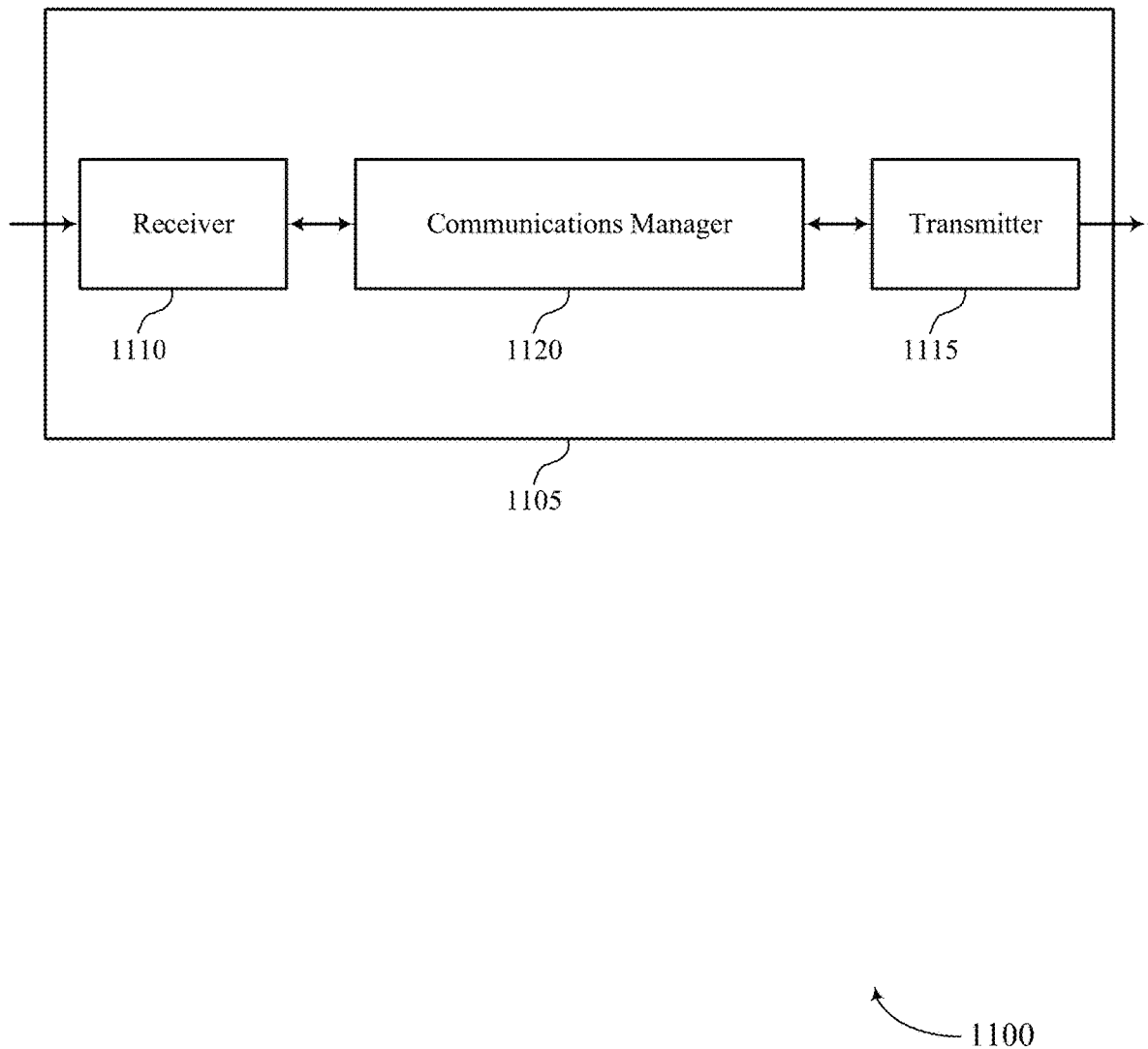
FIGS. 11 and 12 show block diagrams of devices that support zone based operating mode configuration in accordance with aspects of the present disclosure.

FIG. 11 shows a block diagram 1100 of a device 1105 that supports zone based operating mode configuration in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to zone based operating mode configuration). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to zone based operating mode configuration). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of zone based operating mode configuration as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period. The communications manager 1120 may be configured as or otherwise support a means for transmitting control information indicating the default operating mode to one or more UEs in the zone. The communications manager 1120 may be configured as or otherwise support a means for communicating with the one or more UEs in the zone based on the indication of the default operating mode.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for determining an optimal operating mode for one or more UEs served by the device 1105, resulting in optimal system performance and lower-latency communications. For instance, communications with the one or more UEs according to the optimal operating mode may account for interference in a zone, and thus may be more reliable and more efficient.

Figure 12:
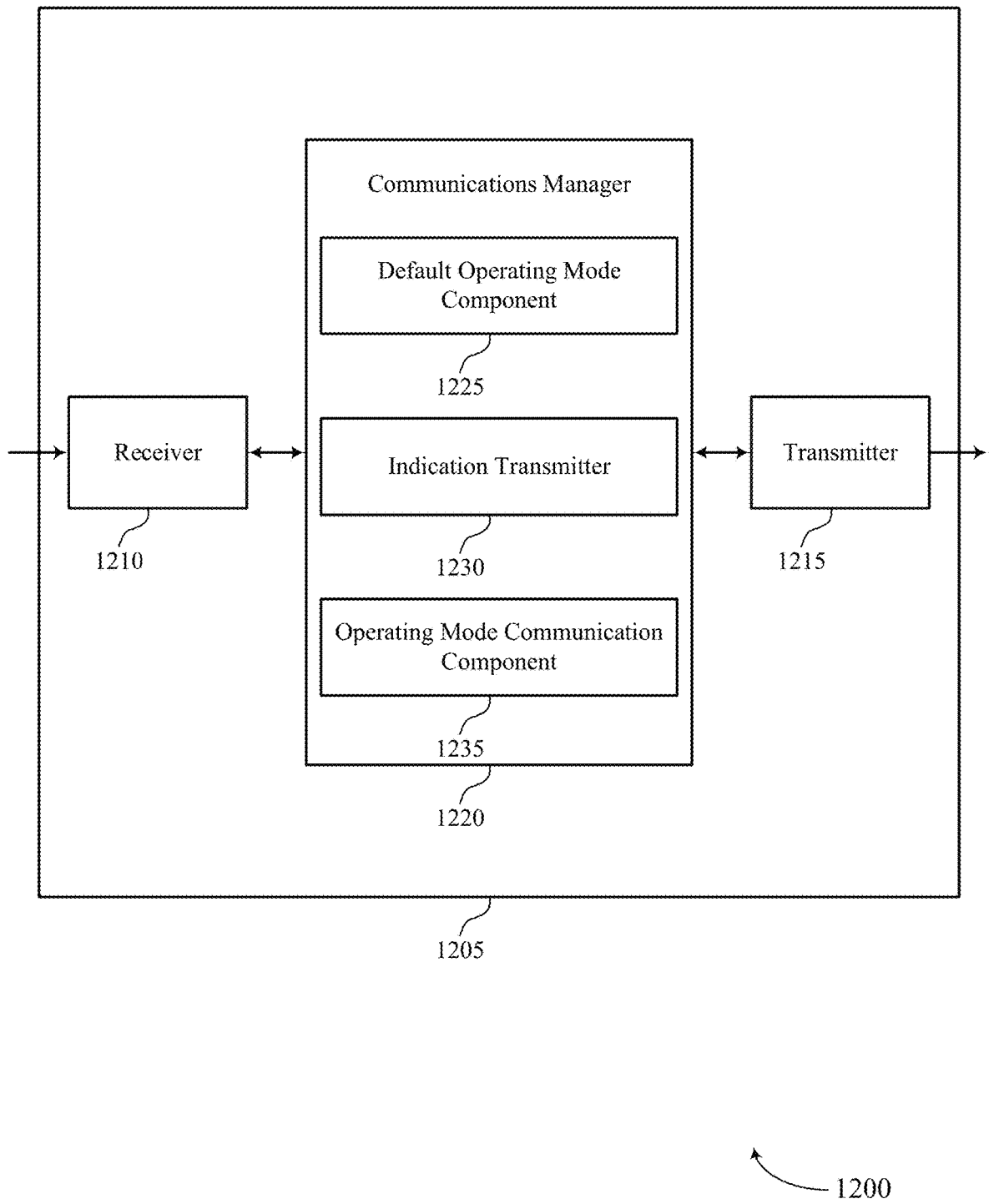

FIG. 12 shows a block diagram 1200 of a device 1205 that supports zone based operating mode configuration in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to zone based operating mode configuration). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to zone based operating mode configuration). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of zone based operating mode configuration as described herein. For example, the communications manager 1220 may include a default operating mode component 1225, an indication transmitter 1230, an operating mode communication component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The default operating mode component 1225 may be configured as or otherwise support a means for determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period. The indication transmitter 1230 may be configured as or otherwise support a means for transmitting control information indicating the default operating mode to one or more UEs in the zone. The operating mode communication component 1235 may be configured as or otherwise support a means for communicating with the one or more UEs in the zone based on the indication of the default operating mode.

Figure 13:
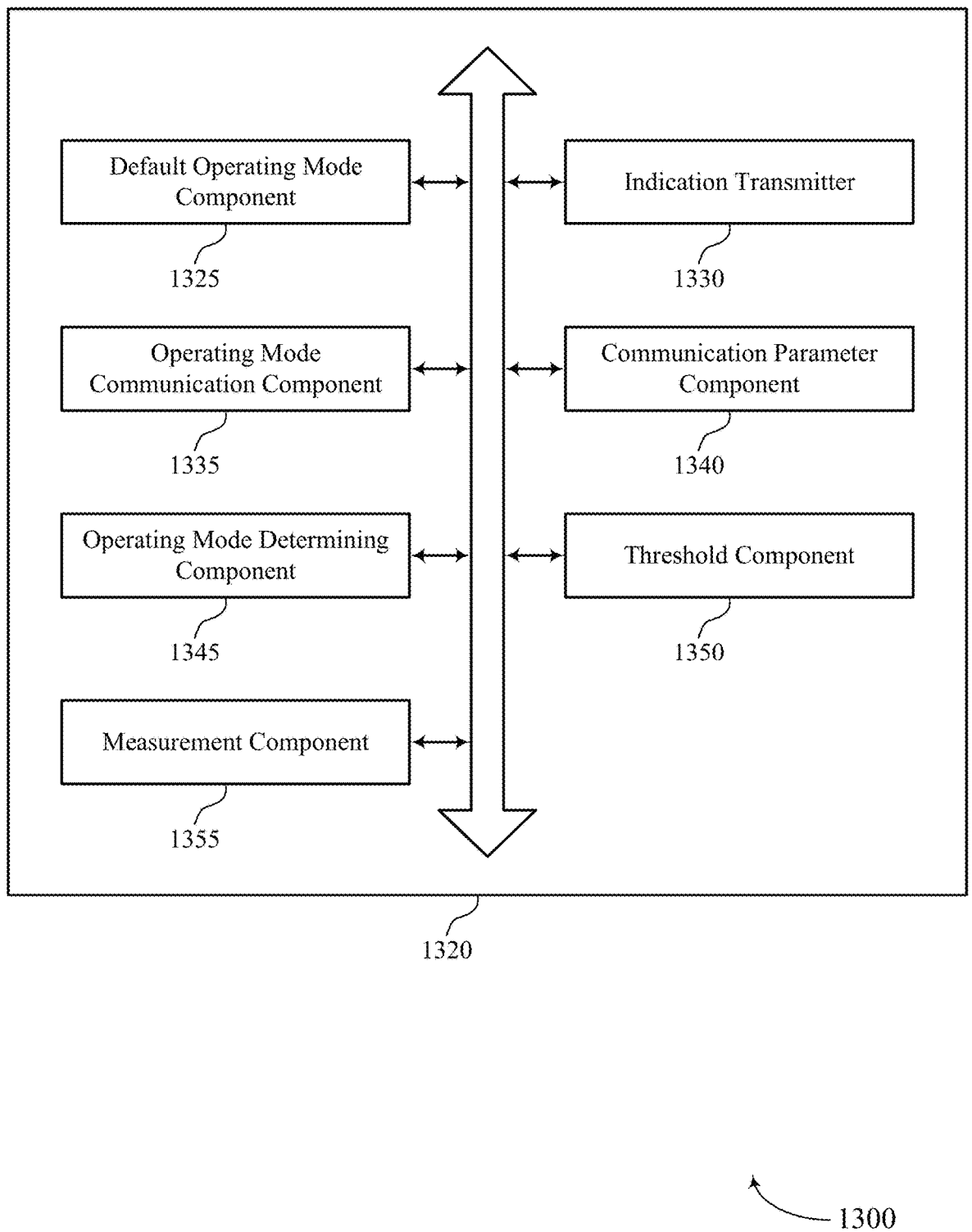
FIG. 13 shows a block diagram of a communications manager that supports zone based operating mode configuration in accordance with aspects of the present disclosure.

FIG. 13 shows a block diagram 1300 of a communications manager 1320 that supports zone based operating mode configuration in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of zone based operating mode configuration as described herein. For example, the communications manager 1320 may include a default operating mode component 1325, an indication transmitter 1330, an operating mode communication component 1335, a communication parameter component 1340, an operating mode determining component 1345, a threshold component 1350, a measurement component 1355, or any combination thereof. Each of these components may communicate, directly or indirectly, with one another (e.g., via one or more buses).

The communications manager 1320 may support wireless communication at a base station in accordance with examples as disclosed herein. The default operating mode component 1325 may be configured as or otherwise support a means for determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period. The indication transmitter 1330 may be configured as or otherwise support a means for transmitting control information indicating the default operating mode to one or more UEs in the zone. In some examples, the indication transmitter 1330 may transmit the control information via an SIB. The operating mode communication component 1335 may be configured as or otherwise support a means for communicating with the one or more UEs in the zone based on the indication of the default operating mode.

In some examples, the communication parameter component 1340 may be configured as or otherwise support a means for determining one or more communication parameters associated with the default operating mode. In some examples, the indication transmitter 1330 may be configured as or otherwise support a means for transmitting control information indicating the one or more communication parameters associated with the default operating mode. In some examples, the one or more communications parameters include a beam, a beam direction, a modulation and coding scheme, a number of layers, a power configuration, a timing configuration, or a combination thereof.

In some examples, the operating mode determining component 1345 may be configured as or otherwise support a means for determining, for a UE in the zone, an operating mode for the UE to use based on determining a number of UEs in the zone, an amount of interference in the zone, a signal density in the zone, or some combination thereof. In some examples, the indication transmitter 1330 may be configured as or otherwise support a means for transmitting, to the UE, an indication of the determined operating mode.

In some examples, the determined operating mode is different from the default operating mode.

In some examples, the operating mode is determined based on a subscription level of the UE.

In some examples, the threshold component 1350 may be configured as or otherwise support a means for identifying one or more thresholds to be used in determining the default operating mode. In some examples, the indication transmitter 1330 may be configured as or otherwise support a means for transmitting, to the UE, an indication including the one or more thresholds.

In some examples, the measurement component 1355 may be configured as or otherwise support a means for receiving, from a UE in the zone, a measurement indication including an indication of an amount of interference in the zone. In some examples, the operating mode determining component 1345 may be configured as or otherwise support a means for determining, based on the measurement indication, an operating mode for the UE to use that is different than the default operating mode. In some examples, the indication transmitter 1330 may be configured as or otherwise support a means for transmitting, to the UE, an indication of the determined operating mode.

Figure 14:
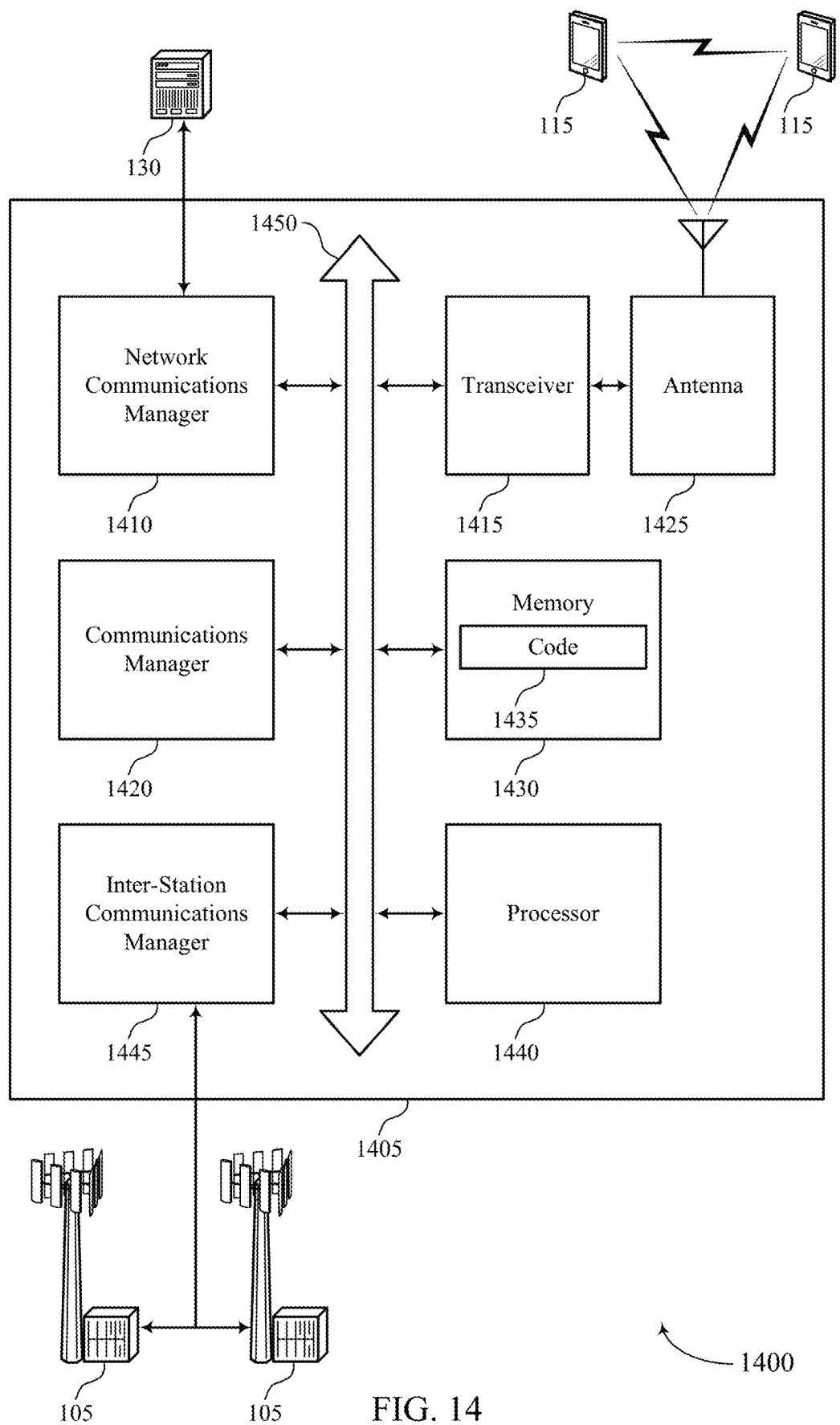
FIG. 14 shows a diagram of a system including a device that supports zone based operating mode configuration in accordance with aspects of the present disclosure.

FIG. 14 shows a diagram of a system 1400 including a device 1405 that supports zone based operating mode configuration in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting zone based operating mode configuration). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period. The communications manager 1420 may be configured as or otherwise support a means for transmitting control information indicating the default operating mode to one or more UEs in the zone. The communications manager 1420 may be configured as or otherwise support a means for communicating with the one or more UEs in the zone based on the indication of the default operating mode.

By including or configuring the communications manager 1420 in accordance with examples as described herein, the device 1405 may support techniques for determining an operating mode for one or more UEs served by the device 1405, resulting in optimal system performance and lower-latency communications. For example, communicating with a UE in an FD mode may be more efficient and latency may be reduced (e.g., as FD mode enables simultaneous uplink and downlink transmission). Communications with a UE in HD mode may support increased reliability, especially in zones with high interference.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of zone based operating mode configuration as described herein, or the processor 1440 and the memory 1430 may be otherwise configured to perform or support such operations.

Figure 15:
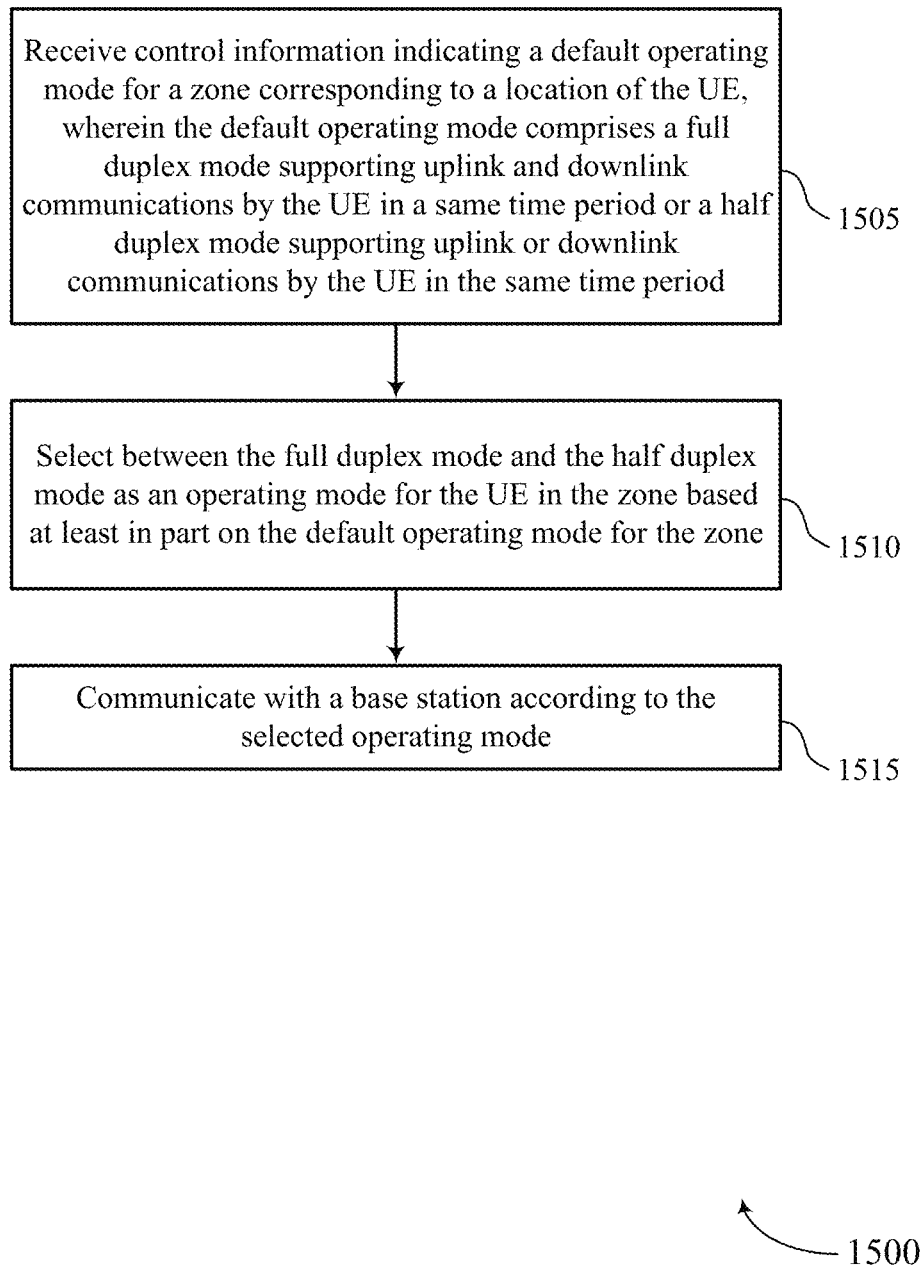
FIGS. 15 through 19 show flowcharts illustrating methods that support zone based operating mode configuration in accordance with aspects of the present disclosure.

FIG. 15 shows a flowchart illustrating a method 1500 that supports zone based operating mode configuration in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period. The operations of 1505 may be performed in accordance with examples as disclosed herein. In some examples, aspects of the operations of 1505 may be performed by a default operating mode component 925 as described with reference to FIG. 9.

At 1510, the method may include selecting between the full duplex mode and the half duplex mode as an operating mode for the UE in the zone based on the default operating mode for the zone. The operations of 1510 may be performed in accordance with examples as disclosed herein. In some examples, aspects of the operations of 1510 may be performed by an operating mode selecting component 930 as described with reference to FIG. 9.

At 1515, the method may include communicating with a base station according to the selected operating mode. The operations of 1515 may be performed in accordance with examples as disclosed herein. In some examples, aspects of the operations of 1515 may be performed by an operating mode communication component 935 as described with reference to FIG. 9.

Figure 16:
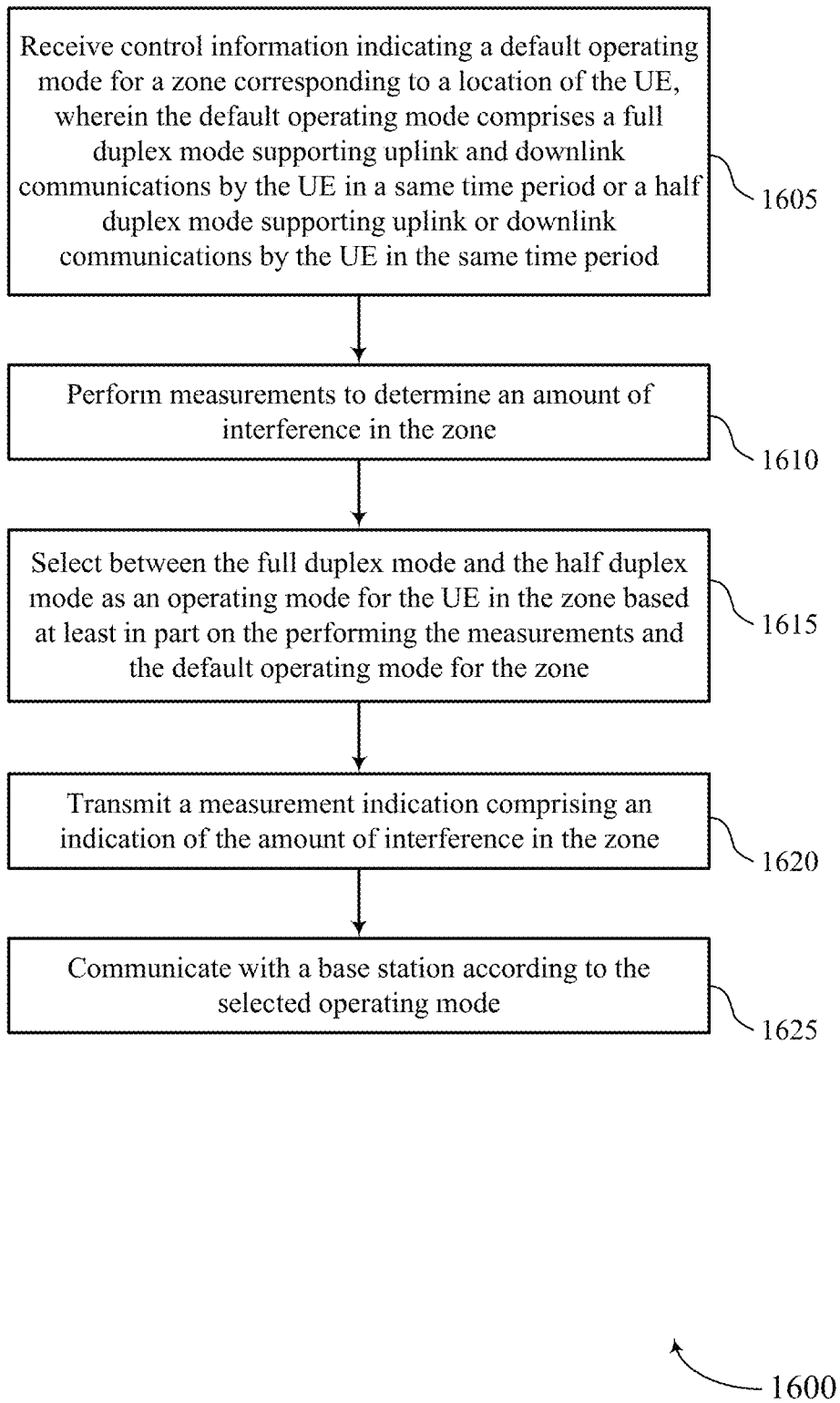

FIG. 16 shows a flowchart illustrating a method 1600 that supports zone based operating mode configuration in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving control information indicating a default operating mode for a zone corresponding to a location of the UE, where the default operating mode includes a full duplex mode supporting uplink and downlink communications by the UE in a same time period or a half duplex mode supporting uplink or downlink communications by the UE in the same time period. The operations of 1605 may be performed in accordance with examples as disclosed herein. In some examples, aspects of the operations of 1605 may be performed by a default operating mode component 925 as described with reference to FIG. 9.

At 1610, the method may include performing measurements to determine an amount of interference in the zone. The operations of 1610 may be performed in accordance with examples as disclosed herein. In some examples, aspects of the operations of 1610 may be performed by a measurement component 945 as described with reference to FIG. 9.

At 1615, the method may include selecting between the full duplex mode and the half duplex mode as an operating mode for the UE in the zone based on the performing the measurements and the default operating mode for the zone. The operations of 1615 may be performed in accordance with examples as disclosed herein. In some examples, aspects of the operations of 1615 may be performed by an operating mode selecting component 930 as described with reference to FIG. 9.

At 1620, the method may include transmitting a measurement indication including an indication of the amount of interference in the zone. The operations of 1620 may be performed in accordance with examples as disclosed herein. In some examples, aspects of the operations of 1620 may be performed by an indication transmitter 950 as described with reference to FIG. 9.

At 1625, the method may include communicating with a base station according to the selected operating mode. The operations of 1625 may be performed in accordance with examples as disclosed herein. In some examples, aspects of the operations of 1625 may be performed by an operating mode communication component 935 as described with reference to FIG. 9.

Figure 17:
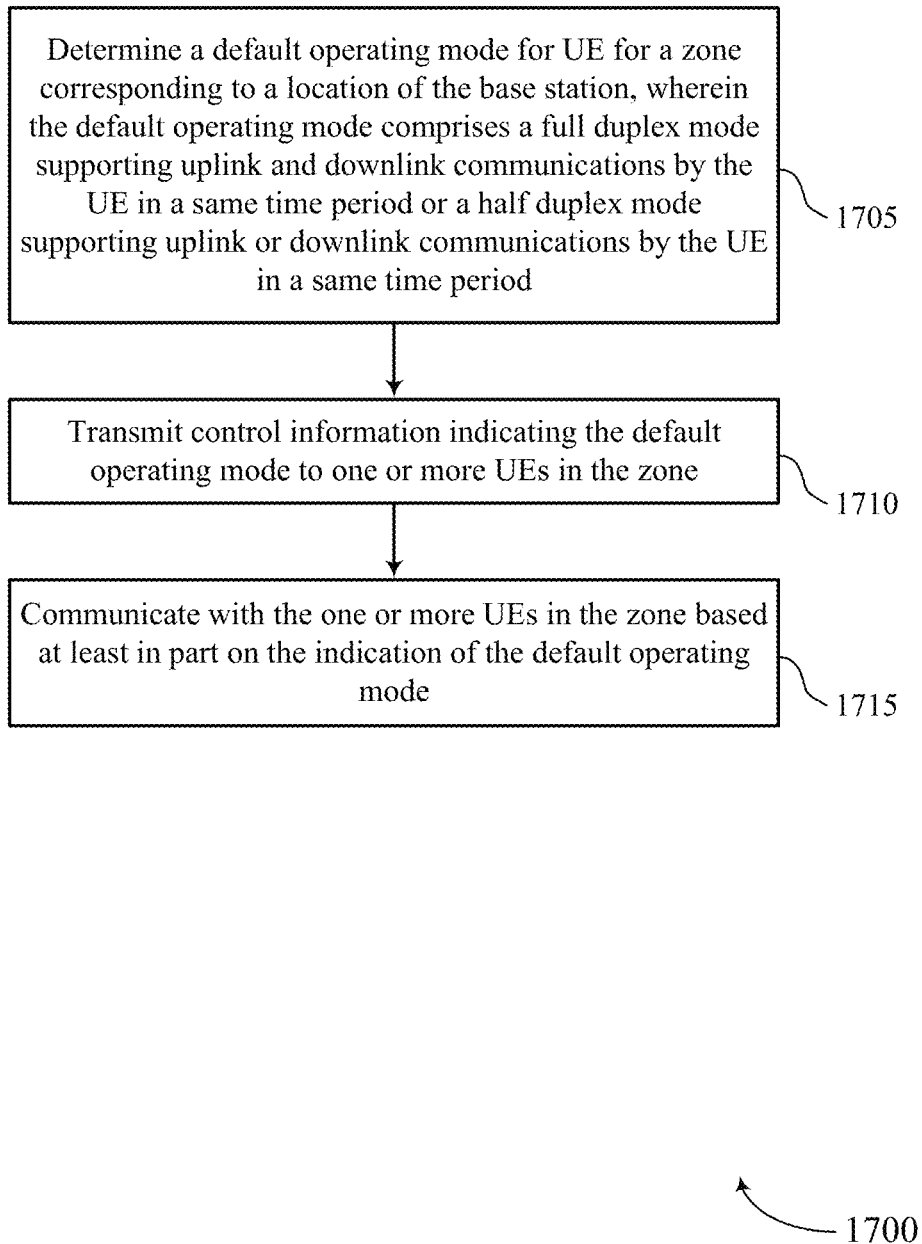

FIG. 17 shows a flowchart illustrating a method 1700 that supports zone based operating mode configuration in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period. The operations of 1705 may be performed in accordance with examples as disclosed herein. In some examples, aspects of the operations of 1705 may be performed by a default operating mode component 1325 as described with reference to FIG. 13.

At 1710, the method may include transmitting control information indicating the default operating mode to one or more UEs in the zone. The operations of 1710 may be performed in accordance with examples as disclosed herein. In some examples, aspects of the operations of 1710 may be performed by an indication transmitter 1330 as described with reference to FIG. 13.

At 1715, the method may include communicating with the one or more UEs in the zone based on the indication of the default operating mode. The operations of 1715 may be performed in accordance with examples as disclosed herein. In some examples, aspects of the operations of 1715 may be performed by an operating mode communication component 1335 as described with reference to FIG. 13.

Figure 18:
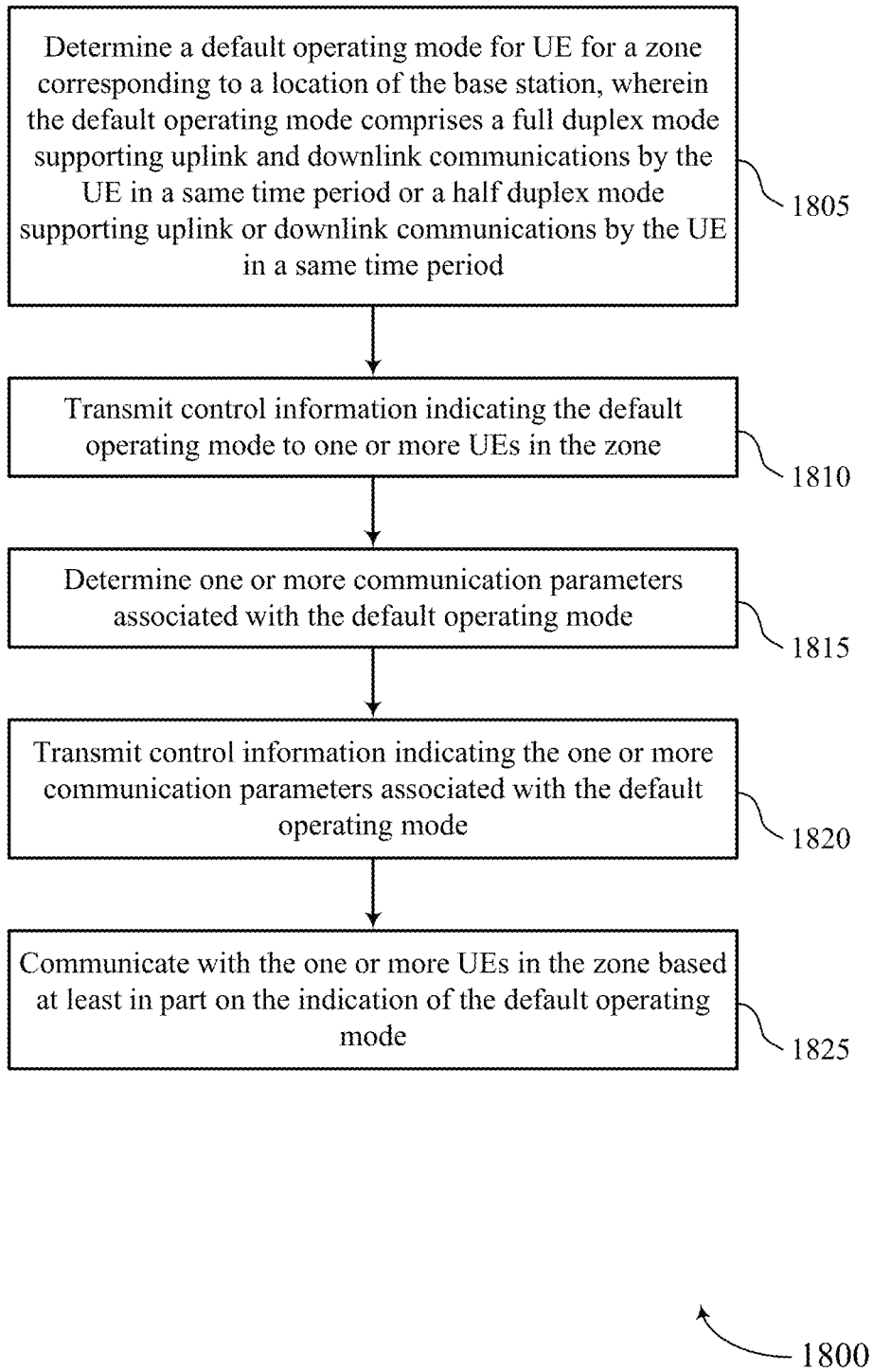

FIG. 18 shows a flowchart illustrating a method 1800 that supports zone based operating mode configuration in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period. The operations of 1805 may be performed in accordance with examples as disclosed herein. In some examples, aspects of the operations of 1805 may be performed by a default operating mode component 1325 as described with reference to FIG. 13.

At 1810, the method may include transmitting control information indicating the default operating mode to one or more UEs in the zone. The operations of 1810 may be performed in accordance with examples as disclosed herein. In some examples, aspects of the operations of 1810 may be performed by an indication transmitter 1330 as described with reference to FIG. 13.

At 1815, the method may include determining one or more communication parameters associated with the default operating mode. The operations of 1815 may be performed in accordance with examples as disclosed herein. In some examples, aspects of the operations of 1815 may be performed by a communication parameter component 1340 as described with reference to FIG. 13.

At 1820, the method may include transmitting control information indicating the one or more communication parameters associated with the default operating mode. The operations of 1820 may be performed in accordance with examples as disclosed herein. In some examples, aspects of the operations of 1820 may be performed by an indication transmitter 1330 as described with reference to FIG. 13.

At 1825, the method may include communicating with the one or more UEs in the zone based on the indication of the default operating mode. The operations of 1825 may be performed in accordance with examples as disclosed herein. In some examples, aspects of the operations of 1825 may be performed by an operating mode communication component 1335 as described with reference to FIG. 13.

Figure 19:
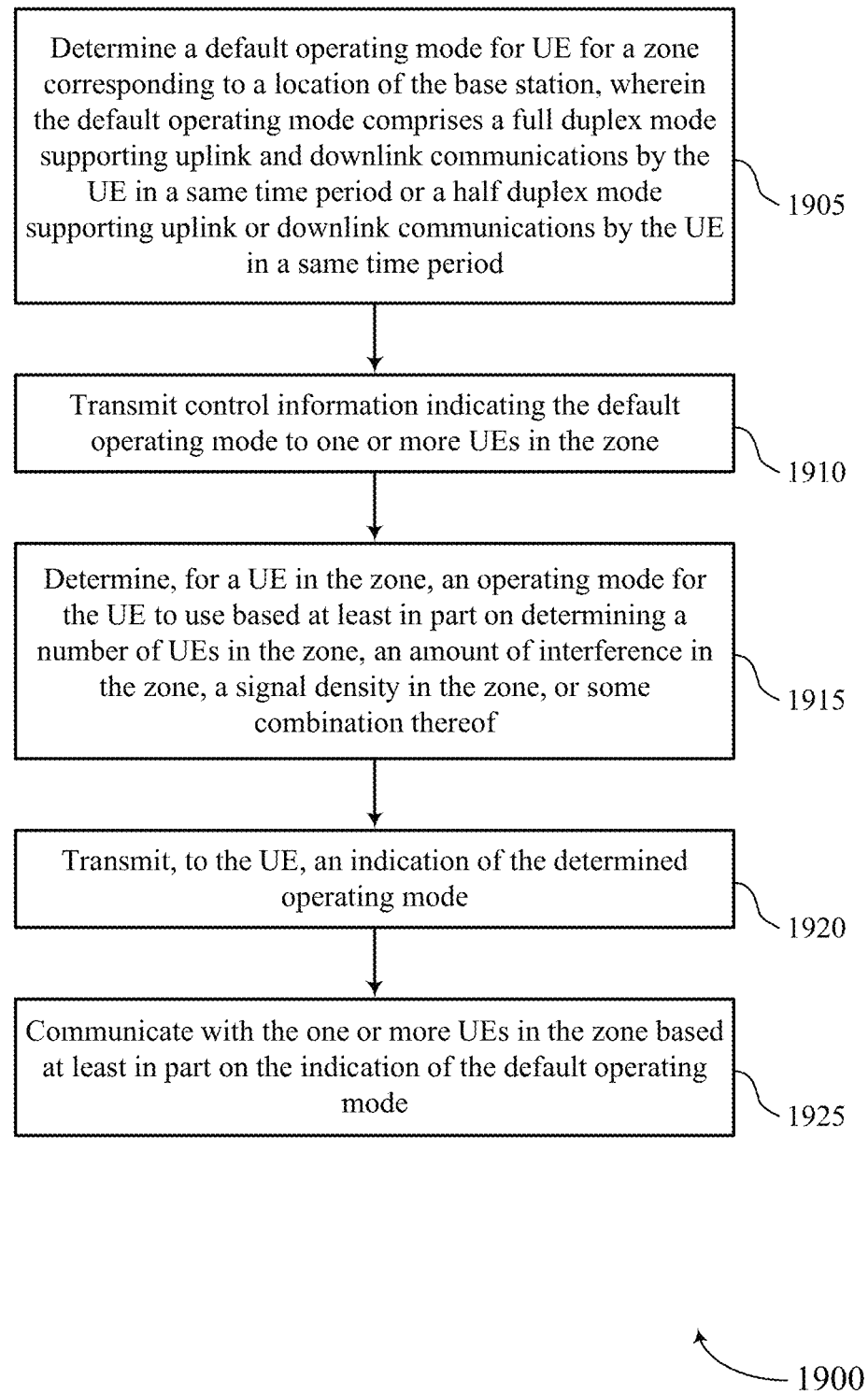

FIG. 19 shows a flowchart illustrating a method 1900 that supports zone based operating mode configuration in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include determining a default operating mode for UE for a zone corresponding to a location of the base station, where the default operating mode includes a full duplex mode supporting uplink and downlink communications by the UE in a same time period or a half duplex mode supporting uplink or downlink communications by the UE in a same time period. The operations of 1905 may be performed in accordance with examples as disclosed herein. In some examples, aspects of the operations of 1905 may be performed by a default operating mode component 1325 as described with reference to FIG. 13.

At 1910, the method may include transmitting control information indicating the default operating mode to one or more UEs in the zone. The operations of 1910 may be performed in accordance with examples as disclosed herein. In some examples, aspects of the operations of 1910 may be performed by an indication transmitter 1330 as described with reference to FIG. 13.

At 1915, the method may include determining, for a UE in the zone, an operating mode for the UE to use based on determining a number of UEs in the zone, an amount of interference in the zone, a signal density in the zone, or some combination thereof. The operations of 1915 may be performed in accordance with examples as disclosed herein. In some examples, aspects of the operations of 1915 may be performed by an operating mode determining component 1345 as described with reference to FIG. 13.

At 1920, the method may include transmitting, to the UE, an indication of the determined operating mode. The operations of 1920 may be performed in accordance with examples as disclosed herein. In some examples, aspects of the operations of 1920 may be performed by an indication transmitter 1330 as described with reference to FIG. 13.

At 1925, the method may include communicating with the one or more UEs in the zone based on the indication of the default operating mode. The operations of 1925 may be performed in accordance with examples as disclosed herein. In some examples, aspects of the operations of 1925 may be performed by an operating mode communication component 1335 as described with reference to FIG. 13.

The following provides an overview of aspects of the present disclosure:

Aspect 1: A method for wireless communication at a UE, comprising: receiving control information indicating a default operating mode for a zone corresponding to a location of the UE, wherein the default operating mode comprises a full duplex mode supporting uplink and downlink communications by the UE in a same time period or a half duplex mode supporting uplink or downlink communications by the UE in the same time period; selecting between the full duplex mode and the half duplex mode as an operating mode for the UE in the zone based at least in part on the default operating mode for the zone; and communicating with a base station according to the selected operating mode.

Aspect 2: The method of aspect 1, wherein the control information is received via an SIB.

Aspect 3: The method of any of aspects 1 through 2, further comprising: determining one or more communication parameters associated with the operating mode.

Aspect 4: The method of aspect 3, wherein determining the one or more communication parameters comprises: receiving control information indicating the one or more communication parameters associated with the operating mode.

Aspect 5: The method of any of aspects 3 through 4, wherein the one or more communication parameters comprise a beam, a beam direction, a modulation and coding scheme, a number of layers, a power configuration, a timing configuration, or a combination thereof.

Aspect 6: The method of any of aspects 1 through 5, wherein selecting between the full duplex mode and the half duplex mode comprises: receiving control information indicating the operating mode.

Aspect 7: The method of any of aspects 1 through 6, wherein selecting between the full duplex mode and the half duplex mode comprises: performing measurements to determine an amount of interference in the zone; selecting the operating mode based at least in part on the performing the measurements; and transmitting a measurement indication comprising an indication of the amount of interference in the zone.

Aspect 8: The method of aspect 7, wherein the measurements comprise a clutter measurement, an interference measurement, or some combination thereof.

Aspect 9: The method of any of aspects 7 through 8, wherein the operating mode is different than the default operating mode.

Aspect 10: The method of any of aspects 1 through 9, further comprising: receiving a measurement indication comprising an indication of an amount of interference in the zone, wherein the operating mode is selected based at least in part on receiving the measurement indication.

Aspect 11: The method of any of aspects 1 through 10, further comprising: transmitting, to one or more other UEs in the zone, an indication of the operating mode and an indication of the zone.

Aspect 12: The method of any of aspects 1 through 11, wherein selecting between the full duplex mode and the half duplex mode further comprises: receiving one or more indications from one or more other UEs indicating the operating modes and zones of the one or more other UEs; determining, based at least in part on the one or more received indications, a number of other UEs in the zone that are operating in the full duplex mode; and determining whether the number of other UEs in the zone that are operating in the full duplex mode satisfies a threshold.

Aspect 13: The method of any of aspects 1 through 12, wherein selecting between the full duplex mode and the half duplex mode is based at least in part on a relative velocity between the UE and a second UE and a quality of service requirement.

Aspect 14: The method of any of aspects 1 through 13, wherein selecting between the full duplex mode and the half duplex mode is based at least in part on a reference signal received power (RSRP) measurement.

Aspect 15: A method for wireless communication at a base station, comprising: determining a default operating mode for UE for a zone corresponding to a location of the base station, wherein the default operating mode comprises a full duplex mode supporting uplink and downlink communications by the UE in a same time period or a half duplex mode supporting uplink or downlink communications by the UE in a same time period; transmitting control information indicating the default operating mode to one or more UEs in the zone; and communicating with the one or more UEs in the zone based at least in part on the indication of the default operating mode.

Aspect 16: The method of aspect 15, wherein the control information is transmitted via an SIB.

Aspect 17: The method of any of aspects 15 through 16, further comprising: determining one or more communication parameters associated with the default operating mode; and transmitting control information indicating the one or more communication parameters associated with the default operating mode.

Aspect 18: The method of aspect 17, wherein the one or more communications parameters comprise a beam, a beam direction, a modulation and coding scheme, a number of layers, a power configuration, a timing configuration, or a combination thereof.

Aspect 19: The method of any of aspects 15 through 18, further comprising: determining, for a UE in the zone, an operating mode for the UE to use based at least in part on determining a number of UEs in the zone, an amount of interference in the zone, a signal density in the zone, or some combination thereof; and transmitting, to the UE, an indication of the determined operating mode.

Aspect 20: The method of aspect 19, wherein the determined operating mode is different from the default operating mode.

Aspect 21: The method of any of aspects 19 through 20, wherein the operating mode is determined based at least in part on a subscription level of the UE.

Aspect 22: The method of any of aspects 15 through 21, further comprising: identifying one or more thresholds to be used in determining the default operating mode; and transmitting, to the UE, an indication comprising the one or more thresholds.

Aspect 23: The method of any of aspects 15 through 22, further comprising: receiving, from a UE in the zone, a measurement indication comprising an indication of an amount of interference in the zone; determining, based at least in part on the measurement indication, an operating mode for the UE to use that is different than the default operating mode; and transmitting, to the UE, an indication of the determined operating mode.

Aspect 24: An apparatus for wireless communication at a UE, comprising a processor; memory coupled with the processor; and instructions stored in the memory and executable by the processor to cause the apparatus to perform a method of any of aspects 1 through 14.

Aspect 25: An apparatus for wireless communication at a UE, comprising at least one means for performing a method of any of aspects 1 through 14.

Aspect 26: A non-transitory computer-readable medium storing code for wireless communication at a UE, the code comprising instructions executable by a processor to perform a method of any of aspects 1 through 14.

Aspect 27: An apparatus for wireless communication at a base station, comprising a processor; memory coupled with the processor; and instructions stored in the memory and executable by the processor to cause the apparatus to perform a method of any of aspects 15 through 23.

Aspect 28: An apparatus for wireless communication at a base station, comprising at least one means for performing a method of any of aspects 15 through 23.

Aspect 29: A non-transitory computer-readable medium storing code for wireless communication at a base station, the code comprising instructions executable by a processor to perform a method of any of aspects 15 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control information indicating a default operating mode for a zone corresponding to a location of the UE, wherein the default operating mode comprises a full duplex mode supporting uplink and downlink communications by the UE in a same time period or a half duplex mode supporting uplink or downlink communications by the UE in the same time period;
   receiving, from one or more other UEs, one or more first indications of an amount of interference in the zone;
   receiving one or more second indications from one or more other UEs indicating the operating modes and zones of the one or more other UEs;
   determining, based at least in part on the one or more received second indications, whether a number of other UEs in the zone that are operating in the full duplex mode satisfies a threshold;
   selecting an operating mode for the UE in the zone based at least in part on operating conditions in the zone, the one or more first indications, and the one or more second indications, wherein the selected operating mode comprises the full duplex mode or the half duplex mode and is the same as or different from the indicated default operating mode for the zone; and
   communicating with a network entity according to the selected operating mode.

2. The method of claim 1, wherein the control information is received via a system information block (SIB).

3. The method of claim 1, further comprising:
   determining one or more communication parameters associated with the selected operating mode.

4. The method of claim 3, wherein determining the one or more communication parameters comprises:
   receiving control information indicating the one or more communication parameters associated with the selected operating mode.

5. The method of claim 3, wherein the one or more communication parameters comprise a beam, a beam direction, a modulation and coding scheme, a number of layers, a power configuration, a timing configuration, or a combination thereof.

6. The method of claim 1, wherein selecting the operating mode for the UE in the zone comprises:
receiving control information indicating the operating mode.

7. The method of claim 1, wherein selecting the operating mode for the UE in the zone further comprises:
performing measurements to determine a second amount of interference in the zone;
selecting the operating mode for the UE in the zone based at least in part on the performing the measurements; and
transmitting a measurement indication comprising a second indication of the second amount of interference in the zone.

8. The method of claim 7, wherein the measurements comprise a clutter measurement, an interference measurement, or some combination thereof.

9. The method of claim 7, wherein the selected operating mode is different than the default operating mode.

10. The method of claim 1,
wherein the one or more first indications comprise one or more measurement indications.

11. The method of claim 1, further comprising:
transmitting, to one or more other UEs in the zone, an indication of the selected operating mode and an indication of the zone.

12. The method of claim 1, wherein selecting the operating mode for the UE in the zone is based at least in part on a relative velocity between the UE and a second UE and a quality of service requirement.

13. The method of claim 1, wherein selecting the operating mode for the UE in the zone is based at least in part on a reference signal received power (RSRP) measurement.

14. An apparatus for wireless communication at a user equipment (UE), comprising:
a processor;
memory coupled with the processor; and
instructions stored in the memory and executable by the processor to cause the apparatus to:
receive control information indicating a default operating mode for a zone corresponding to a location of the UE, wherein the default operating mode comprises a full duplex mode supporting uplink and downlink communications by the UE in a same time period or a half duplex mode supporting uplink or downlink communications by the UE in the same time period;
receive, from one or more other UEs, one or more first indications of an amount of interference in the zone;
receive one or more second indications from one or more other UEs indicating the operating modes and zones of the one or more other UEs;
determine, based at least in part on the one or more received second indications, whether a number of other UEs in the zone that are operating in the full duplex mode satisfies a threshold;
select an operating mode for the UE in the zone based at least in part on operating conditions in the zone the one or more first indications, and the one or more second indications, wherein the selected operating mode comprises the full duplex mode or the half duplex mode and is the same as or different from the indicated default operating mode for the zone; and
communicate with a network entity according to the selected operating mode.

15. The apparatus of claim 14, wherein the instructions are further executable by the processor to cause the apparatus to:
determine one or more communication parameters associated with the selected operating mode.

16. The apparatus of claim 15, wherein the instructions to determine the one or more communication parameters are executable by the processor to cause the apparatus to:
receive control information indicating the one or more communication parameters associated with the selected operating mode.

* * * * *